(12) United States Patent
Tsutsumi et al.

(10) Patent No.: US 7,903,888 B2
(45) Date of Patent: Mar. 8, 2011

(54) IMAGE ENCODING APPARATUS AND IMAGE DECODING APPARATUS

(75) Inventors: Takayuki Tsutsumi, Kawasaki (JP); Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 882 days.

(21) Appl. No.: 11/835,099

(22) Filed: Aug. 7, 2007

(65) Prior Publication Data
US 2008/0037883 A1  Feb. 14, 2008

(30) Foreign Application Priority Data

Aug. 8, 2006 (JP) ................... 2006-216260
Jun. 4, 2007 (JP) ................... 2007-148627
Jul. 9, 2007 (JP) ................... 2007-180157

(51) Int. Cl.
*G06K 9/36* (2006.01)
(52) U.S. Cl. .......................... 382/232; 382/171
(58) Field of Classification Search .................. 382/232, 382/171
See application file for complete search history.

(56) References Cited

U.S. PATENT DOCUMENTS

| 5,321,532 A | 6/1994 | Ishikawa et al. | 358/534 |
| 5,464,173 A | 11/1995 | Sharrow et al. | 358/534 |
| 5,774,634 A | 6/1998 | Honma et al. | 395/109 |
| 5,903,360 A | 5/1999 | Honma et al. | 358/450 |
| 6,252,992 B1 | 6/2001 | Ishikawa | 382/239 |
| 6,546,052 B1 * | 4/2003 | Maeda et al. | 375/240.08 |
| 2002/0037100 A1 * | 3/2002 | Toda et al. | 382/166 |

FOREIGN PATENT DOCUMENTS

| JP | 03-254573 | 11/1991 |
| JP | 04-040074 | 2/1992 |
| JP | 04-326669 | 11/1992 |
| JP | 2002-077631 | 3/2002 |

* cited by examiner

*Primary Examiner* — Vikkram Bali
*Assistant Examiner* — Eueng-Nan Yeh
(74) *Attorney, Agent, or Firm* — Fitzpatrick, Cella, Harper & Scinto

(57) ABSTRACT

Even an image in which a gradation character/line image having variations in pixel values to a certain degree and a natural image are mixed can be reproduced with sufficient quality in the gradation character/line image and high encoding efficiency, and further, encoded data can be generated with high encoding efficiency. An extraction unit binarizes pixel values in an input block with a predetermined threshold, thereby generates identification information identifying pixels to be substituted and pixels not to be substituted. An average differential value generation unit calculates a differential value between an average value of the pixels to be substituted and an average value of the pixels not to be substituted. A substitute color generation unit subtracts the differential value from the pixels to be substituted. An encoding unit encodes the identification information, the differential value and pixel values of the block after substitution.

14 Claims, 24 Drawing Sheets

FIG. 2

| 0 | 1 | 1 | 1 |
|---|---|---|---|
| 0 | 1 | 1 | 0 |
| 0 | 1 | 0 | 0 |
| 0 | 0 | 0 | 0 |

FIG. 5

| 0 | 65 | 69 | 70 |
|---|----|----|----|
| 0 | 63 | 65 | 0  |
| 0 | 61 | 0  | 0  |
| 0 | 0  | 0  | 0  |

FIG. 6

| 65 | 65 | 69 | 70 |
|----|----|----|----|
| 68 | 63 | 65 | 64 |
| 66 | 61 | 65 | 65 |
| 64 | 66 | 68 | 67 |

FIG. 8

| 66 | 66 | 68 | 89 |
|----|----|----|----|
| 68 | 63 | 66 | 65 |
| 66 | 62 | 66 | 65 |
| 64 | 66 | 68 | 66 |

FIG. 9

| 66 | 236 | 238 | 259 |
|----|-----|-----|-----|
| 68 | 233 | 236 | 65  |
| 66 | 232 | 66  | 65  |
| 64 | 66  | 68  | 66  |

FIG. 12

| 65 | 240 | 240 | 240 |
|---|---|---|---|
| 68 | 240 | 240 | 64 |
| 66 | 240 | 65 | 65 |
| 64 | 66 | 68 | 67 |

FIG. 13

| 0 | 1 | 1 | 1 |
|---|---|---|---|
| 0 | 1 | 1 | 0 |
| 0 | 1 | 0 | 0 |
| 0 | 0 | 0 | 0 |

FIG. 14

| 65 | 66 | 66 | 66 |
|---|---|---|---|
| 68 | 66 | 66 | 64 |
| 66 | 66 | 65 | 65 |
| 64 | 66 | 68 | 67 |

FIG. 15

| 65 | 235 | 239 | 240 |
|---|---|---|---|
| 68 | 233 | 235 | 64 |
| 66 | 231 | 65 | 65 |
| 64 | 66 | 68 | 67 |

FIG. 16

| 1 | 0 | 0 | 0 |
|---|---|---|---|
| 0 | 0 | 0 | 0 |
| 0 | 0 | 1 | 1 |
| 0 | 0 | 0 | 0 |

FIG. 17

| 144 | 235 | 239 | 240 |
|---|---|---|---|
| 68 | 233 | 235 | 64 |
| 66 | 231 | 144 | 144 |
| 64 | 66 | 68 | 67 |

FIG. 24

| 2 | 242 | 104 | 120 |
|---|---|---|---|
| 3 | 250 | 248 | 2 |
| 1 | 248 | 1 | 2 |
| 2 | 2 | 3 | 2 |

FIG. 25

| 0 | 1 | 1 | 1 |
|---|---|---|---|
| 0 | 1 | 1 | 0 |
| 0 | 1 | 0 | 0 |
| 0 | 0 | 0 | 0 |

FIG. 26

| 0 | 42 | 0 | 0 |
|---|----|---|---|
| 0 | 50 | 48 | 0 |
| 0 | 48 | 0 | 0 |
| 0 | 0 | 0 | 0 |

FIG. 27

| 2 | 42 | 0 | 0 |
|---|----|---|---|
| 3 | 50 | 48 | 2 |
| 1 | 48 | 1 | 2 |
| 2 | 2 | 3 | 2 |

FIG. 28

| 202 | 255 | 255 | 255 |
|-----|-----|-----|-----|
| 203 | 255 | 255 | 202 |
| 201 | 255 | 201 | 202 |
| 202 | 202 | 203 | 202 |

FIG. 29

| 202 | 242 | 104 | 120 |
|-----|-----|-----|-----|
| 203 | 250 | 248 | 202 |
| 201 | 248 | 201 | 202 |
| 202 | 202 | 203 | 202 |

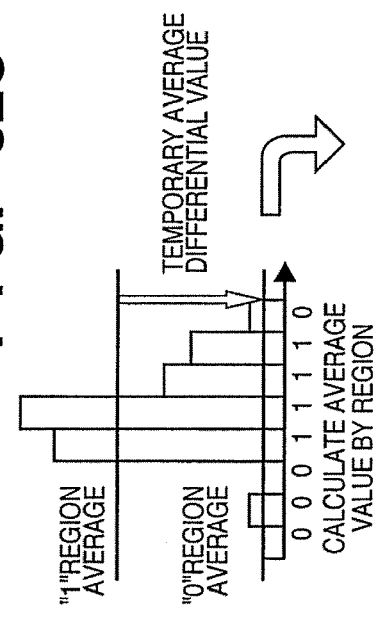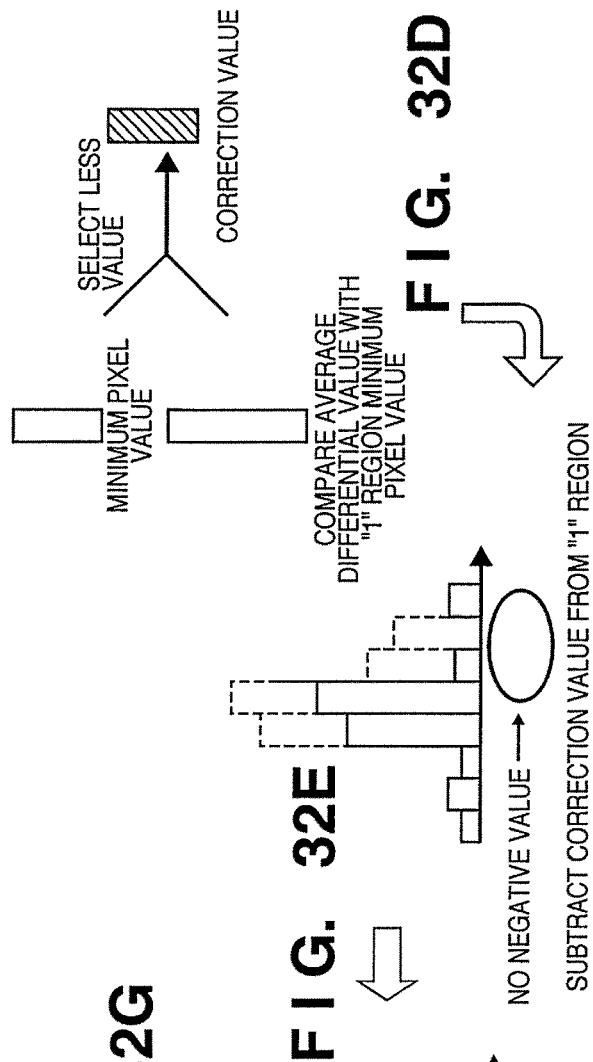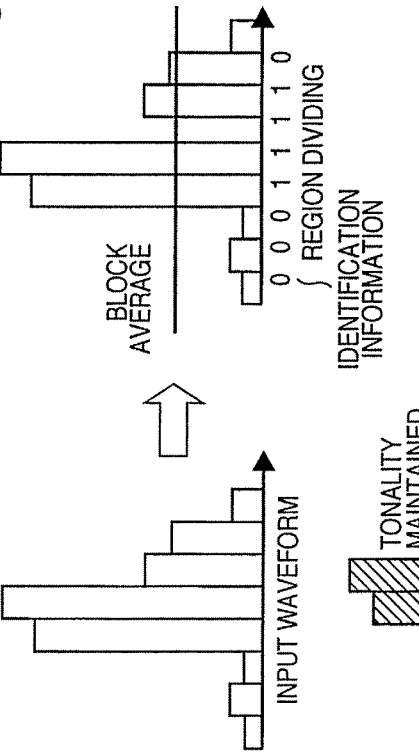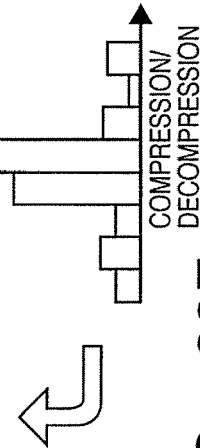

IMAGE ENCODING APPARATUS AND IMAGE DECODING APPARATUS

BACKGROUND OF THE INVENTION

1. Field of the Invention

The present invention relates to a technique for encoding and decoding image data.

2. Description of the Related Art

Japanese Patent Laid-Open No. 04-326669 discloses a technique of compressing a multi-valued image where a character/line image and a natural image are mixed. According to this document, an input image is divided by block, as a unit of orthogonal transformation upon encoding, then it is presumed that a most frequent value within each block indicates a character or line image. Then, the pixel data of the mode color information or density information is selected, and extracted from the block. Then lossless encoding such as run-length encoding is performed on the color to be extracted and identification information indicating whether or not it is the pixel to be extracted (Hereinbelow, these two informations will be generally referred to as "resolution information"). Then, respective pixel values of the natural image after the extraction of character/line image information are substituted with a block average value except the pixels extracted as character/line image information. Then, lossy encoding such as JPEG encoding is performed on the substitution-processed natural image.

FIG. 12 shows a 4×4 pixel block data as an example of the above color information extraction. In the pixel block data in FIG. 12, a (part of) a character image at level "240" is overwritten on a part of a natural image in which an average level is "66". Generally, in a natural image, image information is generated through an analog input device such as a scanner or digital camera, variations occur in pixel values due to noise or the like. On the other hand, in a digitally-generated character image, it can be considered that noise is not mixed and the same value is continued. From this presumption, a mode of the block of interest is detected and extracted as a character/line image from the block. In FIG. 12, as a mode of the pixel block is "240", this value becomes a color to be extracted. Accordingly, identification information indicating the position of the pixel to be extracted is as shown in FIG. 13. The above-described color to be extracted of the character/line image and the above-described identification information are compressed by lossless encoding.

On the other hand, as an average value of the pixel data for which the above-described identification information is "0" is "66", the pixel data of the region in which the above-described identification information is "1" is substituted with the above-described average value. FIG. 14 shows the pixel data (gray-level information) after the substitution. The data is compressed by lossy encoding.

Further, a technique of separating a multi-valued image into plural components and independently encoding the components as disclosed in Japanese Patent Laid-Open Nos. 03-254573, 04-040074 and 2002-077631 is known.

When the color of an overwritten character has the same value as in the pixel block in FIG. 12, the technique disclosed in the above Japanese Patent Laid-Open No. 04-326669 is effective for improving the encoding efficiency. However, when a character image having gradation in color (Hereinbelow, referred to as a "gradation character") is overwritten on a natural image, variations occur in pixel values of character/line image portions. Similarly, variations occur in pixel values when an image including character/line images is obtained by image sensing through an analog input device such as a scanner or digital camera. In this manner, when variations occur in pixel values of character/line images, it is difficult to improve the compressibility.

This problem will be described using FIG. 15 showing a 4×4 block pixel data.

In the pixel data shown in FIG. 15, a character image having values "231", "233", "235", "239" and "240" is overwritten on a part of a natural image in which an average level is "66". In the conventional art, as a mode having a maximum appearance probability within each block becomes a color to be extracted, the color to be extracted in this example is "65", and the identification information indicating the pixel position is as shown in FIG. 16. As an average value of the pixel data for which the identification information is "0" is "144", pixels for which the identification information is "1" are substituted with the average value as shown in FIG. 17 (gray-level information). In the gray-level information, edge components of the pixel data shown in FIG. 15 are almost not eliminated. As a result, the compressibility cannot be improved.

Further, when a histogram within each block is obtained then a threshold value is generated from the histogram and a character portion is extracted, a substitute pixel (a pixel for which the above-described identification information is "1") is substituted with a color to be extracted upon decoding. Accordingly, in a block having tonality such as a gradation character, the gradation cannot be reproduced without difficulty.

SUMMARY OF THE INVENTION

The present invention has been made in view of the above problems, and provides a technique for encoding an image in which plural types of images are mixed with high quality and high compressibility. Particularly, the present invention provides a technique for reproducing even an image, in which a gradation character/line image having variations in pixel values to a certain degree and a natural image are mixed, with sufficient quality in the gradation character/line image and high encoding efficiency.

To attain the above object, the present invention provides an image encoding apparatus comprising: an input unit adapted to input multi-valued image data by block constituted by plural pixels; an identification information generation unit adapted to classify respective pixels within an input block into first and second groups in correspondence with respective pixel values, and generate identification information to identify groups of the respective pixels; a calculating unit adapted to calculate an average value of pixels belonging to the first group, an average value of pixels belonging to the second group, and a differential value between the two average values; a substituting unit adapted to add the differential value to respective pixels belonging to the first group or subtract the differential value from the respective pixels belonging to the first group, so as to reduce a difference between the average value of the first group and the average value of the second group, thereby substitute pixel values belonging to the first group; and an encoding unit adapted to encode respective pixel values in the block after substitution, the differential value and the identification information, and output encoded data of the block of interest.

According to the present invention, an image in which plural types of images are mixed can be encoded with high quality and high compressibility. Particularly, even an image, in which a gradation character/line image having variations in pixel values to a certain degree and a natural image are mixed, can be reproduced with sufficient quality in the gradation character/line image, and encoded data can be generated with high encoding efficiency.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a table showing identification information of a 4×4 pixel block when a threshold value TH0 is "200" in the first embodiment;

FIG. 5 is a table showing an example of output values from a substitute color generation unit in FIG. 1;

FIG. 6 is a table showing an example of output values from a selector in FIG. 1;

FIG. 8 is a table showing an example of gray-level information of a 4×4 pixel block inputted into an image restoration unit in FIG. 7;

FIG. 9 is a table showing an example of pixel data of the 4×4 pixel block restored by the image restoration unit in FIG. 7;

FIG. 12 is a table showing an example of a pixel block to be encoded in the conventional art;

FIG. 13 is a table showing the identification information in the conventional art shown in FIG. 12;

FIG. 14 is a table showing an example of the gray-level information after pixel substitution in the conventional art;

FIG. 15 is a table showing an example of a pixel block to be encoded in the embodiment;

FIG. 16 is a table for explaining the problem of the conventional art;

FIG. 17 is a table for explaining the other problem of the conventional art;

FIG. 24 is a table showing an example of pixel data of a 4×4 pixel block inputted into a substitute color generation unit in FIG. 23;

FIG. 25 is a table showing an example of identification information of a 4×4 pixel block inputted into the substitute color generation unit in FIG. 23;

FIG. 26 is a table showing an example of substitute color of a 4×4 pixel block outputted from a first substitute color generation unit in FIG. 23;

FIG. 27 is a table showing an example of gray-level information of a 4×4 pixel block outputted from a first selector in FIG. 23;

FIG. 28 is a table showing an example of gray-level information of a 4×4 pixel block outputted from a second substitute color generation unit in FIG. 23;

FIG. 29 is a table showing an example of gray-level information of a 4×4 pixel block outputted from a second selector in FIG. 23;

FIGS. 32A to 32G are waveform histograms showing an advantage of the encoding apparatus according to the fourth embodiment.

DESCRIPTION OF THE EMBODIMENTS

Hereinbelow, embodiments of the present invention will be described in detail based on the attached drawings.

First Embodiment

Figure 1:
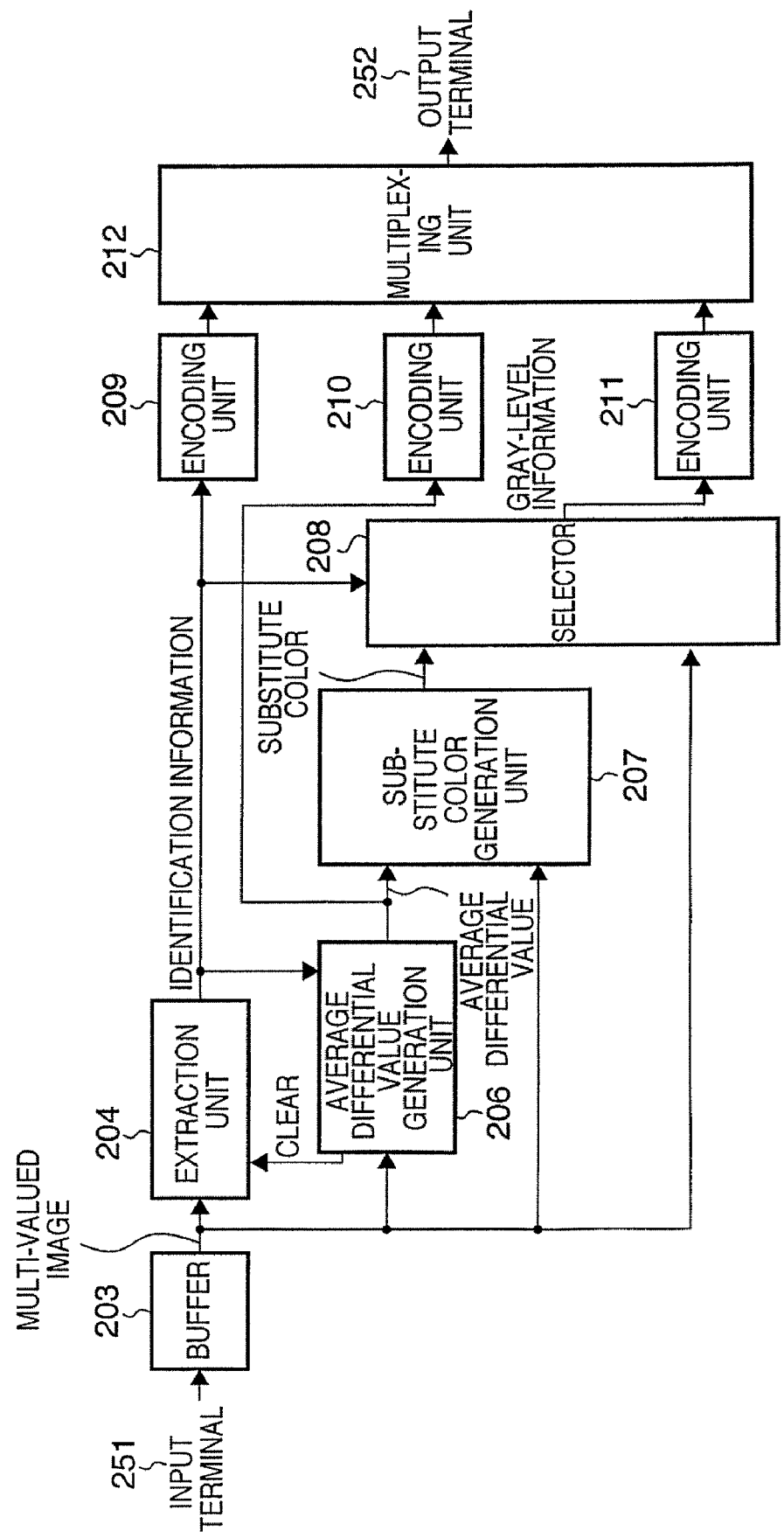
FIG. 1 is a block diagram showing a configuration of an encoding apparatus according to a first embodiment.

FIG. 1 is a block diagram showing a configuration of an encoding apparatus according to a first embodiment.

In FIG. 1, reference numeral 251 denotes an input terminal to input a multi-valued image; and 203, a buffer for temporarily storing pixel data upon dividing the multi-valued image by block as an input unit. Numeral 204 denotes an extraction unit to determine pixel data to be extracted (hereinbelow, referred to as a "color to be extracted") from the multi-valued image within each block and to generate identification information (1-bit determination information for 1 pixel) to identify each pixel as a pixel to be extracted or not to be extracted. In other words, the extraction unit 204 classifies the respective pixels within an input block into a first group as a subject of pixel value substitution and a second group as a non-subject of pixel value substitution, and functions as an identification information generator to generate identification information to identify a group of each pixel. Note that the identification information is determined in correspondence with each pixel value, and generated in correspondence with each pixel position. The details of the extraction unit 204 will be described later.

Numeral 206 denotes an average differential value generation unit which calculates an average value of pixel data by a region indicated with the identification information, and outputs a differential value of the obtained plural average values (hereinbelow, referred to as an "average differential value"); 207, a substitute color generation unit which generates pixel data (hereinbelow, referred to as a "substitute color") after substitution of the above-described pixel to be extracted; 208, a selector which selects one of the input multi-valued image data and the substitute color data and output the selected data; 209, a first encoding unit which performs encoding such as run-length encoding on the identification information; and 210, a second encoding unit which encodes the average differential value. The encoding units 209 and 210 generate lossless encoded data. Numeral 211 denotes a third encoding unit to encode an output value (hereinbelow, referred to as "gray-level information") from the selector 208. The encoding unit 211 may be a lossless encoding unit, but in the present embodiment, it is a lossy encoding unit which is appropriate for a natural image such as a JPEG image. Numeral 212 denotes a multiplexing unit which packs respective encoded data for storage in a memory in the subsequent stage and output the packed data as encoded data; and 252, an output terminal which outputs the encoded data.

Figure 18:
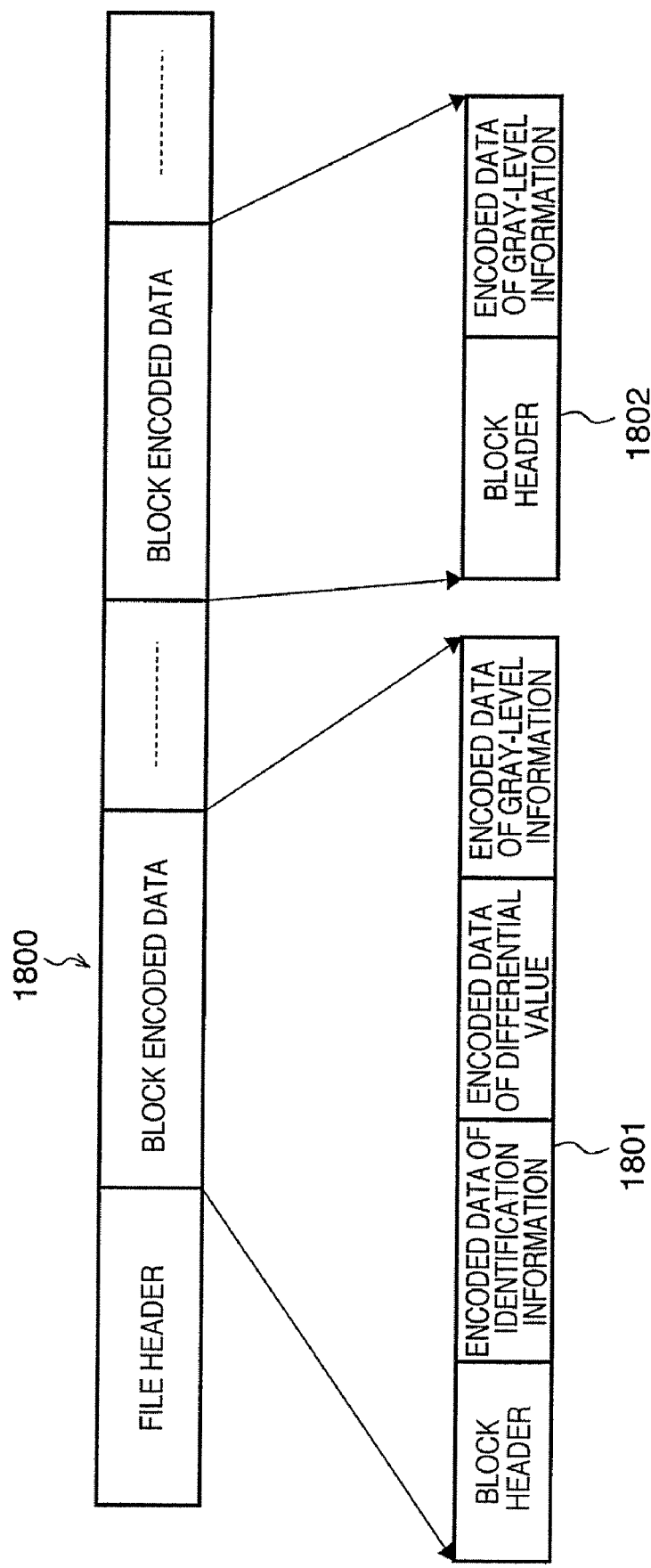
FIG. 18 illustrates a data structure of encoded data generated by the encoding apparatus according to the embodiment.

FIG. 18 illustrates a data structure of an encoded data file 1800 outputted from the multiplexing unit 212. As shown in FIG. 18, the encoded data file 1800 has a file header holding information necessary for decoding such as size information (the number of pixels in horizontal and vertical directions) of image data, the number of color components, and the number of bits of the respective colors. Following the file header, encoded data of respective blocks are stored. One block encoded data is of the type of block data 1801 or of the type of block data 1802 shown in FIG. 18. The block data 1801 has a block header indicating the corresponding type, followed by encoded data of identification information generated by the encoding unit 209, encoded data of an average differential value generated by the encoding unit 210, and encoded data of gray-level information generated by the encoding unit 211. The block data 1802 has a block header indicating the corresponding type, followed by data obtained by encoding input multi-valued image data by the encoding unit 211. The grounds of these data structures will be apparent from the following description.

Next, the operation of the encoding apparatus in FIG. 1 will be described. For the sake of simplicity in explanation, multi-valued image data to be encoded in the present embodiment indicates a monochrome multi-valued image, 1 pixel corresponds to 8 bits (256 levels) and a pixel value indicates a density.

The multi-valued image inputted from the input terminal 251 is temporarily stored in the buffer 203, then sequentially read out in block units, and sent to the extraction unit 204, the average differential value generation unit 206, the substitute color generation unit 207 and the selector 208.

In the extraction unit 204, a pixel to be extracted is determined, and identification information to identify each pixel within the block as a pixel to be extracted or a pixel not to be extracted is generated. More particularly, the extraction unit 204 generates the identification information by binarizing the multi-valued image read in block units with a threshold value TH0. Note that in the identification information, a value "1" indicates that the pixel is a pixel to be extracted, and "0", the pixel is a pixel not to be extracted.

Hereinbelow, the operation of the extraction unit 204 will be described as an example where the input multi-valued image is a 4×4 pixel image as shown in FIG. 15.

Figure 2:
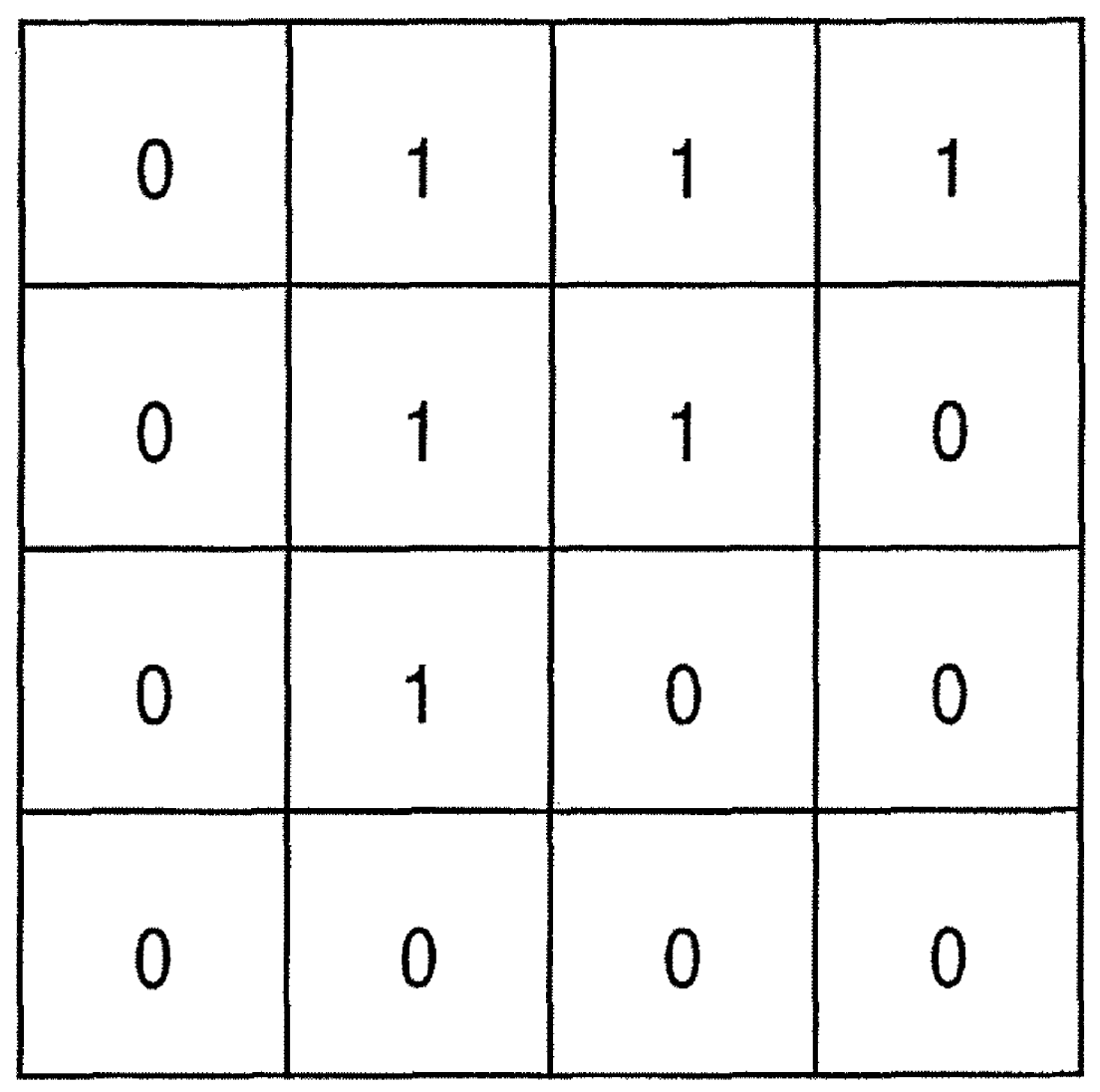

Assuming that the threshold value TH0 for determination of a pixel to be extracted is "200", among the above-described pixel data, pixel data having "200" or greater value is binarized to "1", while pixel data having a value less than "200" is binarized to "0". As a result, "0" or "1" binarized data is generated by each pixel position within each block. FIG. 2 shows 1 block (4×4 pixels) identification information binarized as above. The threshold value TH0 is set by a CPU (not shown) or the like, or obtained from a block average value or block histogram.

The average differential value generation unit 206 calculates an average value (AVE1) of a pixel group for which the identification information outputted from the extraction unit 204 is "1" and an average value (AVE2) of a pixel group for which the identification information is "0". Further, the average differential value generation unit 206 calculates a differential value (differential information) between the calculated two average values, i.e., an average differential value (D=AVE1−AVE2). Thus the average differential value generation unit 206 supplies the calculated two average values (AVE1 and AVE2) and the average differential value (D=AVE1−AVE2) to the substitute color generation unit 207 and the encoding unit 210.

Note that when the absolute value of the average differential value (D) is equal to or less than a predetermined threshold value, it is determined that extraction is not necessary, and the average differential value and the identification information are cleared to "0". Otherwise, only the average differential value may be cleared to "0" since the substitution processing to be described later does not actually operate when the average differential value is "0". As a result, when the absolute value of the average differential value D is equal to or less than a predetermined threshold value, the encoded data of the block becomes only encoded data of gray-level information as indicated with block encoded data 1802 in FIG. 18.

Figure 3:
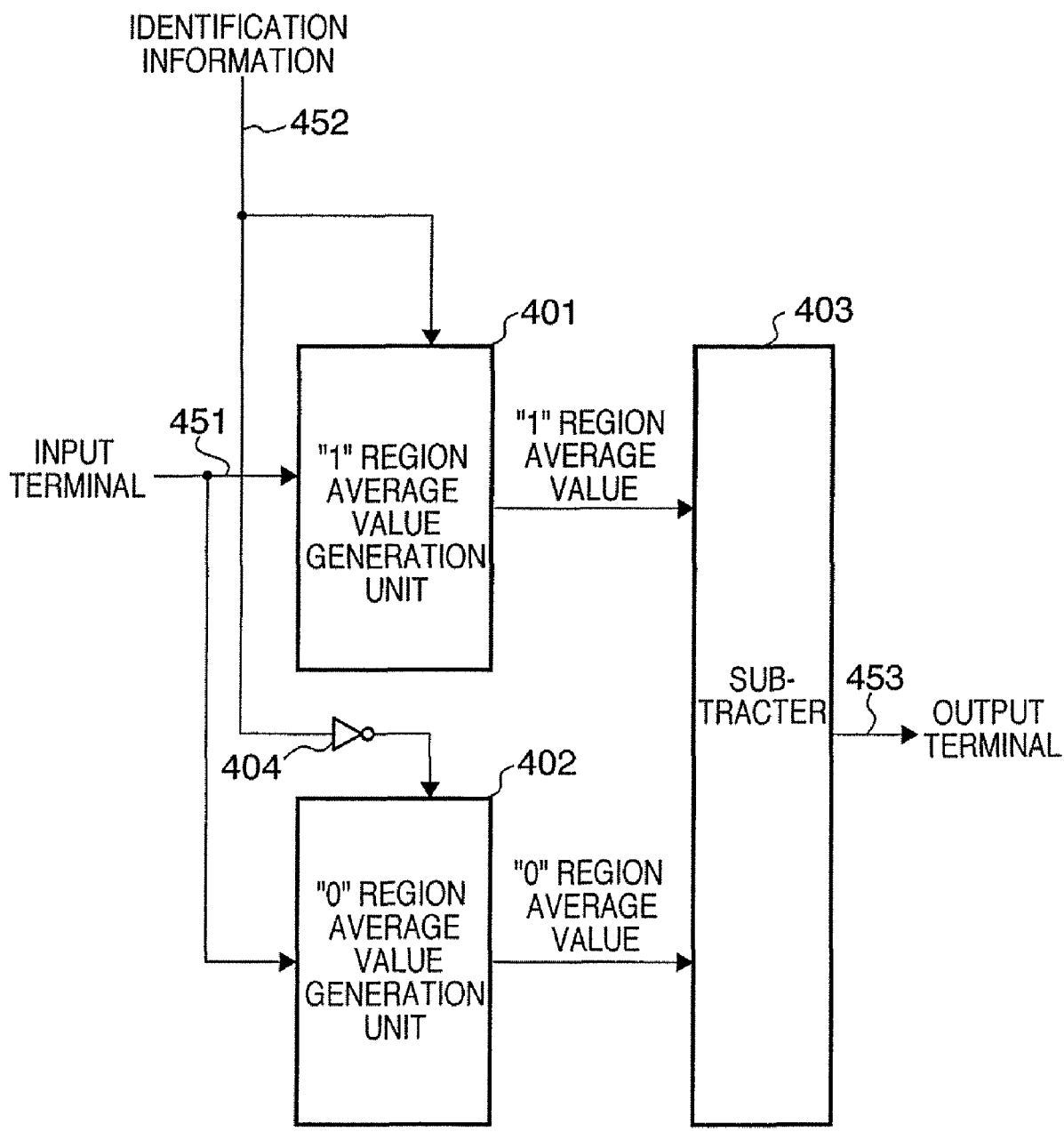
FIG. 3 is a block diagram showing a configuration of an average differential value generation unit in FIG. 1.

Hereinbelow, the operation of the average differential value generation unit 206 will be described using FIG. 3 showing the configuration of the average differential value generation unit 206.

A multi-valued image inputted from an input terminal 451 is sent to a "1" region average value generation unit 401 and a "0" region average value generation unit 402.

Further, identification information outputted from the extraction unit 204 is also inputted from an input terminal 452, and its value is inverted by the "1" region average value generation unit 401 and an inverter 404 and sent to the "0" region average value generation unit 402.

The "1" region average value generation unit 401 calculates an average value (AVE1) of pixel data corresponding to the "1" identification information.

Figure 4:
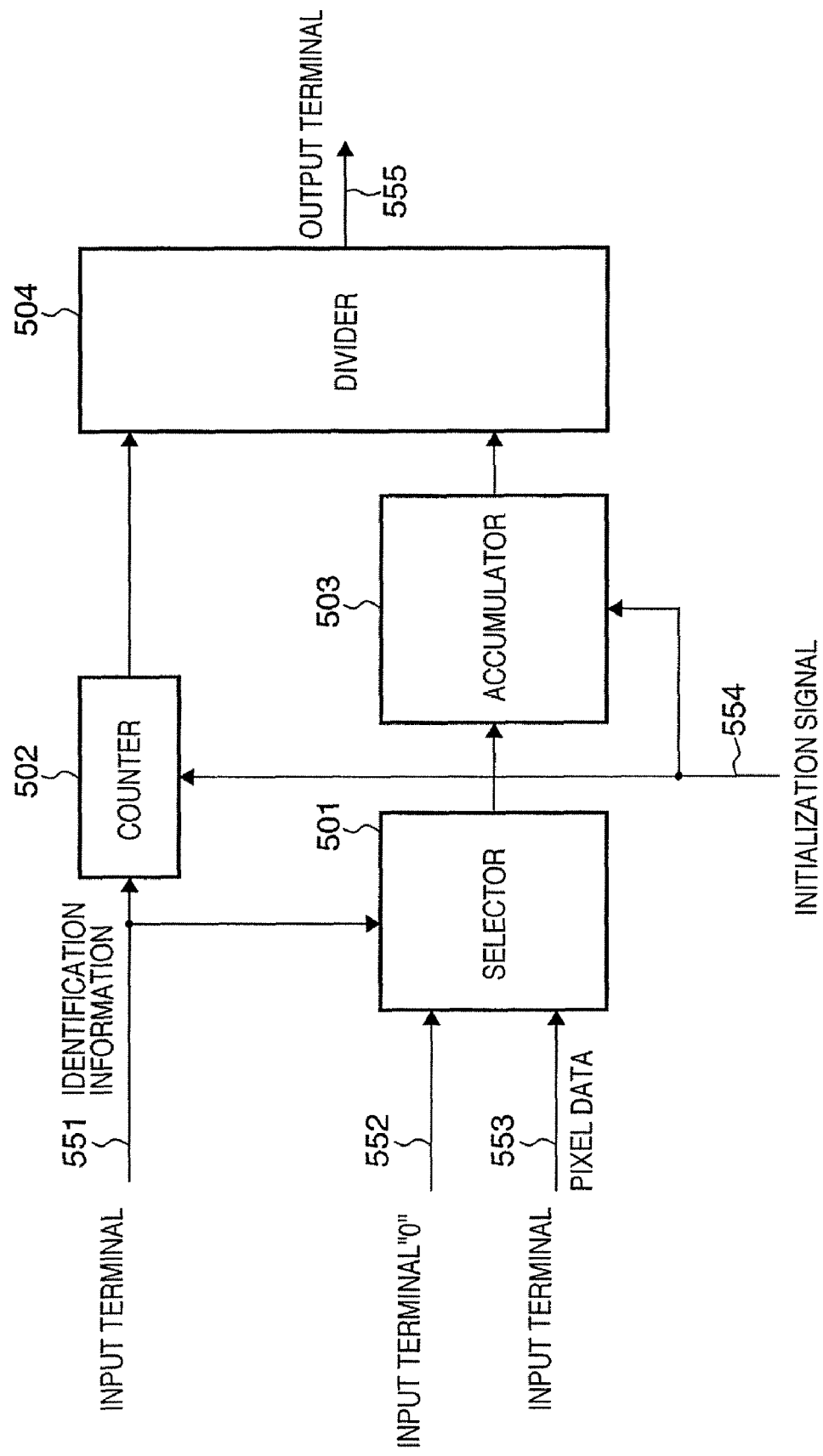
FIG. 4 is a block diagram showing a "1" region average value generation unit in FIG. 3.

FIG. 4 shows a configuration of the "1" region average value generation unit 401. Hereinbelow, the operation of the "1" region average value generation unit 401 will be described with reference to FIG. 4.

In FIG. 4, numeral 551 denotes an input terminal to input identification information outputted from the extraction unit 204. The identification information inputted via the input terminal 551 is supplied to a selector 501 and a counter 502.

The selector 501 has input terminals 552 and 553. In the input terminal 552, a fixed value "0" is previously set. Further, pixel data of the multi-valued image inputted from the input terminal 451 is inputted into the input terminal 553. When the identification information (determination information) inputted into the input terminal 551 is "1", the selector 501 selects the data at the input terminal 553, i.e., the pixel data, and outputs the selected data. On the other hand, when the identification information is "0", the selector 501 selects the fixed value "0" set at the input terminal 552 and outputs the selected value.

An accumulator 503 cumulatively adds the output values from the selector 501, and supplies the result of cumulative addition to a divider 504.

On the other hand, the counter 502 counts the number of "1" value of the identification information for 1 block, and supplies the result of counting to the divider 504. Note that as described above, the identification information has "1" or "0" value.

The output value from the accumulator 503 immediately after input of final data of 1 block is the total sum of pixel values corresponding to "1" value of the identification information in the block of interest. Further, the output value from the counter 502 is the number of "1" value of the identification information. Accordingly, the divider 504 divides the output value from the accumulator 503 by the output value from the counter 502, thereby obtains the average value in the region where the identification information is "1", i.e., the average value (AVE1) of pixel data to be extracted. The average value (AVE1) of the pixel data to be extracted is outputted from a terminal 555. Note that when the output value from the counter 502 is "0", a value "0" is outputted from the output terminal 555.

Further, as the above average value (AVE1) is calculated by block, it is necessary to clear the counter 502 and the accumulator 503 prior to input of head data of each block. Accordingly, a controller (not shown) zero-clears (resets) the counter 502 and the accumulator 503 via an initialization signal 554 upon start of calculation of the average value (AVE1) of pixels to be extracted within each block.

Returning to FIG. 3, the "1" region average value (AVE1) as the output value from the "1" region average value generation unit 401 is sent to a subtracter 403.

The "0" region average value generation unit 402, having the same configuration of that of the "1" region average value generation unit 401 described using FIG. 5, performs the same operation. Note that the identification information inverted by the inverter 404 is inputted into the input terminal 551. Accordingly, the output value from the "0" region average value generation unit 402 is a "0" region average value (AVE2) as an average value of pixel data of a region where the identification information inputted from the input terminal 452 is "0", i.e., as an average value of pixel data of pixels not be to extracted. The "0" region average value (AVE2) is sent to the subtracter 403.

The subtracter 403 outputs the result of subtraction of the "0" region average value (AVE2) from the "1" region average value (AVE1) (D=AVE1−AVE2) to an output terminal 453.

Hereinbelow, the more particular operation of the average differential value generation unit 206 will be described in a case where the 4×4 pixel block multi-valued image data shown in FIG. 15 and the identification information shown in FIG. 2 are inputted.

In the multi-valued image, pixel data "235", "239", "240", "233", "235" and "231" correspond to "1" value of the identification information. Accordingly, the average value "235" of the pixel data becomes the output value from the "1" region average value generation unit 401, i.e., the "1" region average value (AVE1).

Similarly, in the multi-valued image, pixel data "65", "68", "64", "66", "65", "65", "64", "66", "68" and "67" correspond to "0" value of the identification information. Accordingly, the average value "65" of the pixel data becomes the output value from the "0" region average value generation unit 402, i.e., the "0" average value (AVE2). The output value from the average differential value generation unit 206, i.e., the average differential value (D) becomes "170" as a result of subtraction of the "0" region average value from the "1" region average value by the subtracter 403.

Returning to FIG. 1, the substitute color generation unit 207 subtracts the average differential value (D) outputted form the average differential value generation unit 206 from the respective multi-valued image pixel data within the block outputted from the buffer 203. The result of subtraction is outputted as a substitute color. Note that when the result of subtraction is negative, the substitute color generation unit 207 clips the substitute color of the pixel of interest to "0" (boundary value) and outputs the value.

Next, an operation of the substitute color generation unit 207 will be described in an example where the input multi-valued image is the 4×4 pixel block pixel data shown in FIG. 15, and the input average differential value (D) is "170" in the description of the average differential value generation unit 206.

The substitute color generation unit 207 subtracts the average differential value "170" from all the pixel data within the block. As described above, when the result of subtraction is a negative value, "0" is outputted as the substitute color value. As a result, the substitute color generation unit 207 outputs 4×4 pixel data shown in FIG. 5 as substitute colors.

In the selector 208, when the input identification information (determination information) is "0", pixel data of the input multi-valued image corresponding to the position of the identification information is selected. On the other hand, when the identification information is "1", pixel data of the substitute color outputted from the substitute color generation unit 207 corresponding to the position of the identification information is selected. The above processing is repeated by the block end pixel, thereby gray-level information of the block of interest is obtained.

For example, when the 4×4 pixel block multi-valued image shown in FIG. 15, the 4×4 pixel block substitute colors shown in FIG. 5 are inputted into the selector 208 and the 4×4 pixel block identification information shown in FIG. 2 is inputted as a control signal into the selector 208, in the present embodiment, values of one of the pixel groups are substituted such that the difference between the average value (AVE1) of the pixel group for which the identification information is "1" and the average value (AVE2) of the pixel group for which the identification information is "0" is reduced. More particularly, in the pixels corresponding to the "0" value of the identification information, the pixel data of the multi-valued image is selected, on the other hand, in the pixels corresponding to the "1" value of the identification information, the pixel data of the substitute color is selected. As a result, as the output values from the selector 208, 4×4 pixel block gray-level information shown in FIG. 6 is outputted. As shown in FIG. 6, the pixel value in the position judged as a character/line image is approximately the same value as that of a pixel value of non-character/line image. That is, the processing is performed as if a natural image including no character/line image is generated.

The gray-level information shown in FIG. 6 is compressed (lossy encoded) by the encoding unit 211 using e.g. JPEG encoding. Note that the lossy encoding method is not limited to the JPEG method but any other encoding appropriate to natural images may be applied.

On the other hand, the identification information outputted from the extraction unit 204 is compressed (lossless encoded) by the encoding unit 209 using run-length encoding. Note that as the lossless encoding, any other encoding appropriate to binary data encoding may be applied. Similarly, the average differential value (D) outputted from the average differential value generation unit 206 is compressed (lossless encoded) by the encoding unit 210. Note that as the encoding by the encoding unit 209 and the encoding unit 210 greatly influences the image quality, lossless encoding is preferable. On the other hand, as high compressibility is expected in the encoding by the encoding unit 211, lossy encoding is in same cases preferred. However, lossless encoding may be employed as long as a target compressibility is obtained.

The multiplexing unit 212 combines the encoded data from the encoding unit 209, the encoded data from the encoding unit 210 and the encoded data from the encoding unit 211 so as to facilitate storage into the memory in the subsequent stage, and outputs the combined data from the output terminal 252. The multiplexing unit 212, previously provided with a memory for storing pattern data indicating encoded data for which all the identification information is "0", determines whether or not the encoded data of the identification information outputted from the encoding unit 209 and the pattern data correspond with each other. When these data do not correspond with each other, i.e., the encoded data of the identification information outputted from the encoding unit 209 includes at least one "1" identification information, the multiplexing unit 212 combines the encoded data from the encoding units 209, 210 and 211, thereby generates encoded data which is of the same type as that of the block data 1801 in FIG. 18 and outputs the data. On the other hand, when the encoded data of the identification information outputted from the encoding unit 209 and the pattern data correspond with each other, i.e., when the encoded data outputted from the encoding unit 209 indicates all "0" identification information, the multiplexing unit 212 deletes the encoded data from the encoding units 209 and 210, generates encoded data of the type of the block data 1802 in FIG. 18 using the encoded data from the encoding unit 211, and outputs the data. In this manner, as described above, the encoded data file which is of the same type as that of the block encoded data 1801 or 1802 in FIG. 18 is generated.

Note that in the above description, the multiplexing unit 212 compares the encoded data from the encoding unit 209 with the pattern data. However, the present invention is not limited to this arrangement. For example, it may be arranged such that, when the extraction unit 204 generates identification information for 1 block, the extraction unit 204 supplies a signal indicating whether or not all the values of the identification information are "0" to the multiplexing unit 212. In this case, the multiplexing unit 212 generates encoded data which is of the same type as that of the block data 1801 or 1802 in accordance with the signal from the extraction unit 204.

Figure 7:
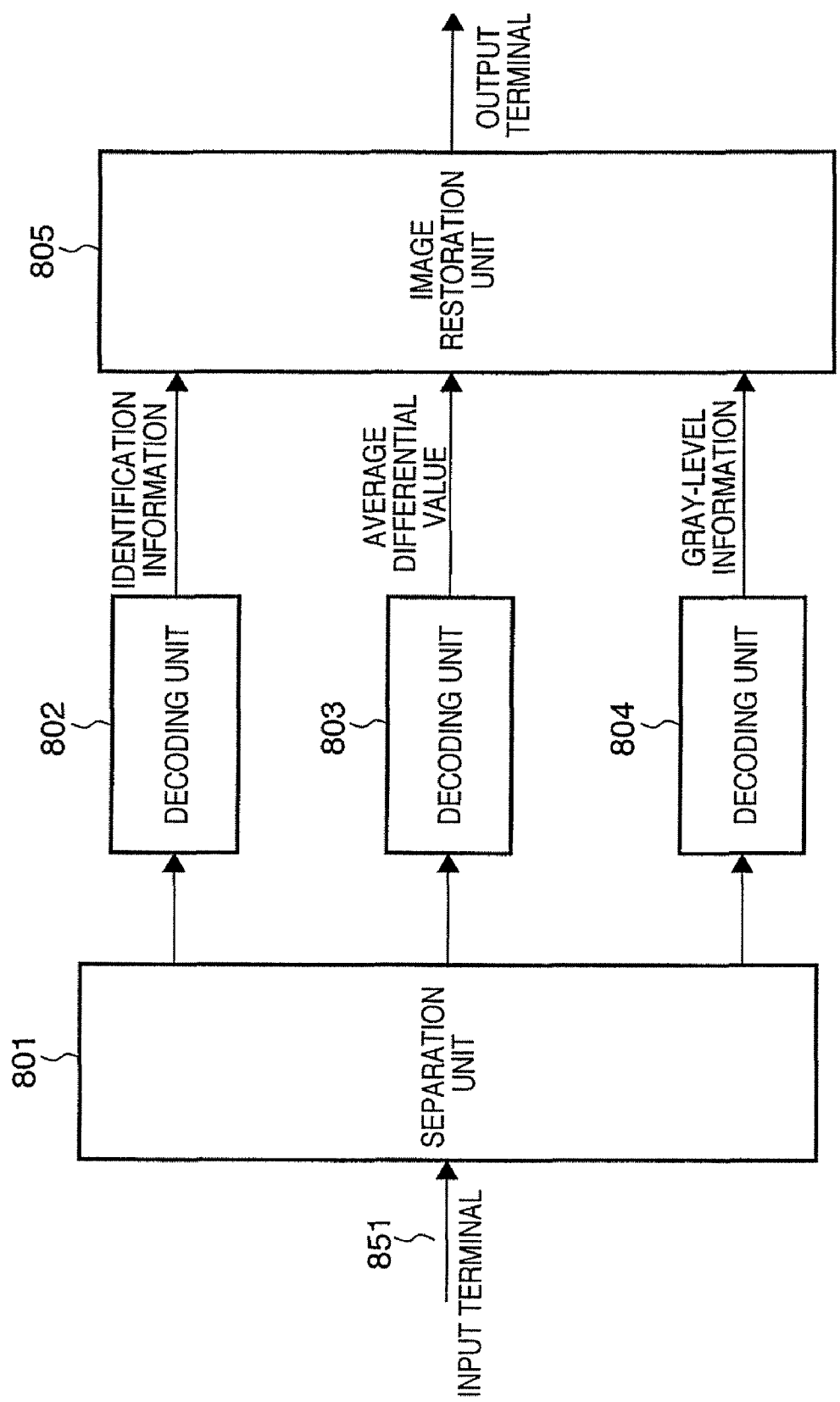
FIG. 7 is a block diagram showing a configuration of an image decoding apparatus according to the first embodiment.

Next, image decoding processing according to the present embodiment will be described. FIG. 7 is a block diagram showing a configuration of an image decoding apparatus according to the present embodiment.

In FIG. 7, numeral 851 denotes an input terminal to input encoded data read from a memory (not shown); 801, a separation unit to separate the encoded data into encoded identification information, an encoded average differential value (D) and encoded gray-level information; 802, a first decoding unit to decode the above identification information; 803, a second decoding unit to decode the above average differential value (D); 804, a third decoding unit to decode the above gray-level information; and 805, an image restoration unit to restore a multi-valued image and outputs the result of restoration.

Next, 1 block decoding processing in the above configuration will be described below.

Note that encoded data for 1 block inputted from the input terminal 851 is equivalent to the encoded data outputted from the output terminal 251 in FIG. 1.

The separation unit 801 analyzes a block header of the inputted encoded data of the block of interest, and determines whether the encoded data of the block of interest is of the type of the block data 1801 or the type of the block data 1802 in FIG. 18. When it is determined that the block of interest is of the same type as that of the block data 1801, the separation unit 801 separates encoded data of identification information, encoded data of average differential value and encoded data of gray-level information, following the block header, and supplies the separated respective encoded data to the corresponding decoding units 802, 803 and 804.

Note that the separation unit 801 is previously provided with a memory for storing pattern data of encoded data for which all the identification information is "0" and pattern data of encoded data of "0" average differential value. When it is determined that the encoded data of the block of interest is of the same type as that of the block data 1802, the separation unit 801 outputs the pattern data of the encoded data for which all the identification information is "0", previously stored in the memory, to the decoding unit 802, and outputs the pattern data of the encoded data of "0" average differential value, stored in the memory, to the decoding unit 803. Then, the separation unit 801 outputs the encoded data of gray-level information following the input block header to the decoding unit 804.

The decoding unit 802 decodes the input encoded identification information, and output the result of decoding to the image restoration unit 805. The decoding unit 802, corresponding to the encoding unit 209 in FIG. 1, performs lossless decoding. Accordingly, the identification information outputted from the decoding unit 802 completely corresponds with the identification information outputted from the extraction unit 204 in FIG. 1.

The decoding unit 803, corresponding to the encoding unit 210 in FIG. 1, performs lossless decoding. Accordingly, the average differential value decoded by the decoding unit 803 completely corresponds with the average differential value (D) before encoding outputted from the average differential value generation unit 206 in FIG. 2.

The decoding unit 804 decodes the inputted encoded gray-level information for 1 block. As the decoding unit 804 according to the present embodiment decodes lossy encoded data, the result of decoding does not completely correspond with the gray-level data outputted form the selector 208 in FIG. 1, but gray-level information appropriately maintaining the tonality can be restored.

Regarding the "0" region of the identification information (determination information) outputted from the decoding unit 802, the image restoration unit 805 outputs the gray-level information outputted from the decoding unit 804 without any processing. Further, regarding the "1" region of the identification information outputted form the decoding unit 802, the image restoration unit 805 adds the average differential value (D) outputted from the decoding unit 803 to the gray-level information outputted from the decoding unit 804 and outputs the result of addition.

For example, when the 4×4 pixel block identification information (determination information) shown in FIG. 2, the average differential value "170" calculated in the operation of the average differential value generation unit 206 in FIG. 1, and the 4×4 pixel block gray-level information shown in FIG. 8 are inputted into the image restoration unit 805, the image restoration unit 805 adds the average differential value "170" to the above gray-level information corresponding to the "1" region of the identification information. Accordingly, as the 1 block image data outputted from the image restoration unit 805, a 4×4 pixel block multi-valued image shown in FIG. 9 is restored.

As described above, according to the present embodiment, even when an image block as shown in FIG. 15 is inputted, in the lossy encoding processing, 4×4 pixel gray-level information including almost no edge as shown in FIG. 6 is obtained. Accordingly, the entropy upon encoding of gray-level information is greatly reduced, and the encoding efficiency is greatly improved.

On the other hand, as the identification information and the average differential value (D) are lossless encoded, degradation of image quality does not easily occur even in a multi-valued image where a character/line and a natural image are mixed.

Further, as the tonality of a pixel to be extracted is almost restored with the gray-level information, degradation of image quality is not easily detected even in a multi-valued image where a character image not at one level such as a gradation character image and a natural image are mixed.

Note that in the above embodiment, when it is determined that the encoded data of the block of interest is of the same type as that of the block data 1802, the separation unit 801 outputs dummy encoded data of identification information (pattern data) to the decoding unit 802, and outputs dummy encoded data of average differential value (pattern data) to the decoding unit 803. However, the present invention is not limited to this arrangement. For example, the following arrangement may be made.

That is, the separation unit 801 analyzes the block header, determines whether the encoded data of the block of interest is of the type of the block data 1801 or the type of the block data 1802, and outputs a signal indicating the result of determination to the image restoration unit 805. Further, when it is determined that the encoded data of the block of interest is of the type of the block data 1802, the separation unit 801 outputs only the encoded data of the gray-level information following the block header to the decoding unit 804. When the image restoration unit 805 inputs a signal indicating that the block of interest is of the type of the block data 1801, the image restoration unit 805 performs the above-described processing. On the other hand, when the image restoration unit 805 inputs a signal indicating that the block of interest is of the same type as that of the block data 1802, the image restoration unit 805 selects only the result of decoding from the decoding unit 804 and outputs the selected data. In this arrangement, the same result as that of the above-described embodiment can be obtained.

Further, in the above-described embodiment, a pixel for which the identification information is "1" is a pixel to be extracted, however, a pixel for which the identification information is "0" may be the pixel to be extracted. In this case, the substitute pixel is also the pixel for which the identification information is "0", and the identification information when the absolute value of the average differential value (D) is equal to or less than the predetermined value is all cleared to "1". Further, as the substitution processing does not actually operate when the average differential value is cleared to "0", it may be arranged such that the average differential value (D) is cleared to "0" in stead of clearing all the identification information to "1".

Further, in the above-described embodiment, 1 block has a size of 4×4 pixels. However, the block size is preferably 8×8 pixels or integral multiple of this size as long as the encoding unit 211 performs the JPEG encoding processing. The 4×4 pixel block size in the embodiment is an example for simplification of the explanation.

Further, the present invention is not particularly limited to separation between a character portion and the other portion. The present invention is appropriately employed when a high value group and a low value group exist within a block of a region and these groups are encoded.

Modification to First Embodiment

The above-described first embodiment may be realized as a computer program. An example of this arrangement will be described below.

Figure 19:
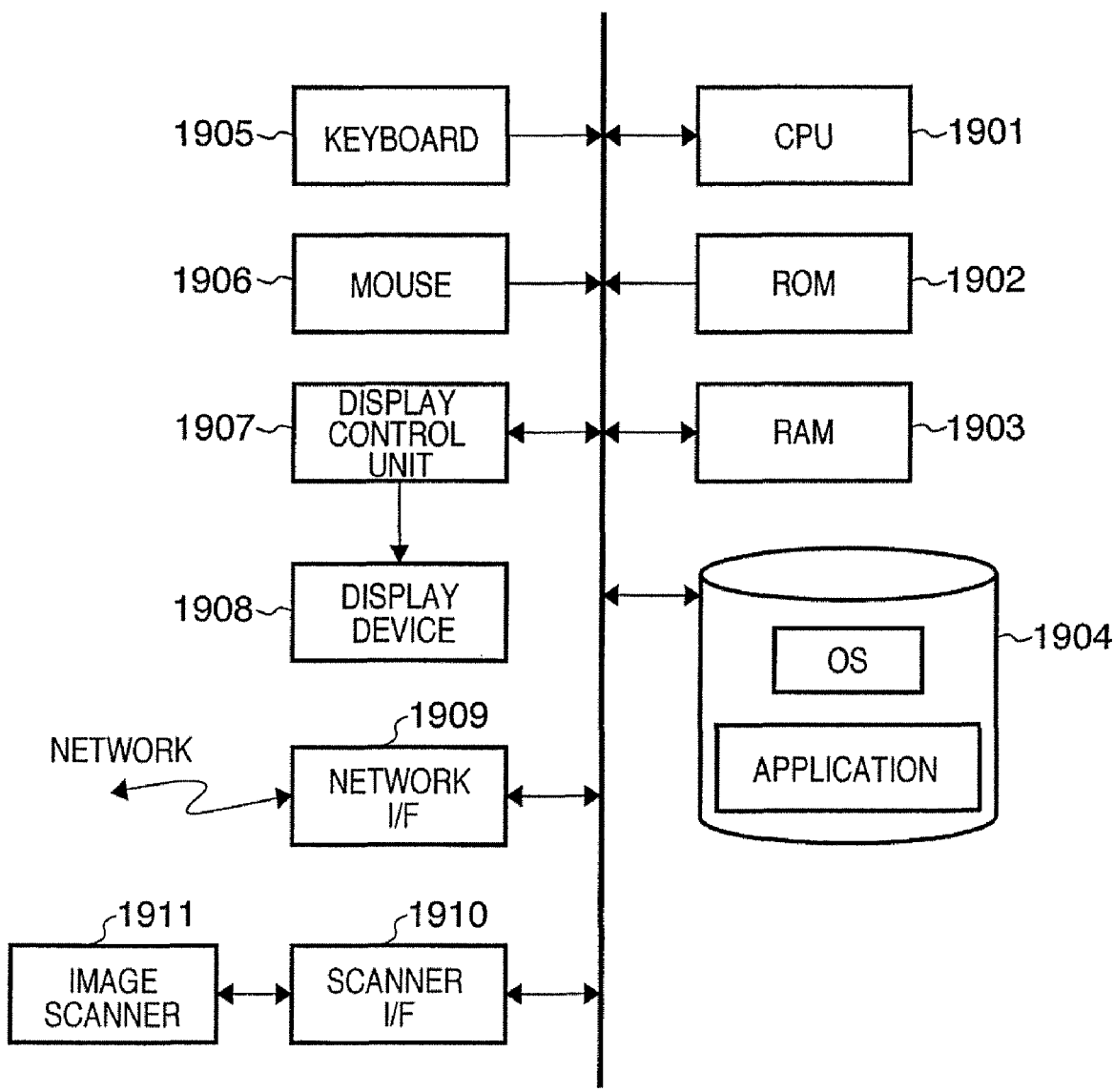
FIG. 19 is a block diagram showing a configuration of an information processing apparatus according to a modification to the first embodiment.

FIG. 19 is a block diagram showing a configuration of an information processing apparatus (personal computer or the like) employed in the present modification.

In FIG. 19, numeral 1901 denotes a CPU for controlling the entire apparatus; 1902, a ROM holding a boot program and a BIOS; 1903, a RAM used as a work area for the CPU 1901; 1904, a large capacity external storage device such as a hard disk holding an OS (Operating System), an application program of the present modification and various data files; 1905, a keyboard; 1906, a mouse as a pointing device; 1907, a display control unit including a video memory and a controller to perform drawing processing to the video memory and to output an image from the video memory as a video signal to the outside; 1908, a display device (CRT, a liquid crystal display device or the like) to input the video signal from the display control unit 1907 and produce a display; 1909, a network interface; 1910, a scanner interface; and 1911, an image scanner.

In the above configuration, when the power of the present apparatus is turned ON, the CPU 1901 loads the OS from the external storage device 1904 to the RAM 1903 in accordance with the boot program in the ROM 1902, thereby the apparatus functions as an information processing apparatus. Then, when it is instructed with the keyboard 1905 or the mouse 1906 to start the application program of the present modification, the CPU 1901 loads the corresponding application program from the external storage device 1904 to the RAM 1903, and executes the program, thereby the apparatus functions as an image processing apparatus.

The processing procedure performed by the CPU 1901 after the start of the application program will be described below. Note that in the following description, an original image is read from the image scanner 1911 then compression-encoded, and stored as a file into the external storage device 1904.

Further, when the application program is performed, a buffer for temporarily storing the image data read with the scanner 1911 and an area for storing various variables are ensured in the RAM 1902. Further, for the sake of simplicity in explanation, the image scanner 1911 is set so as to read an original in a monochrome multi-value mode (8 bits per 1 pixel). Image data read with the image scanner 1911 becomes luminance value. Note that this is an inverse value to the density value in the above-described first embodiment, and "0" and "1" values upon binarization are inverse values to those in the above-described first embodiment. That is, the difference between the luminance and the density is not a substantial difference, since the present invention is applicable as long as a character/line image pixel and a non-character/line image pixel can be separated.

Figure 20:
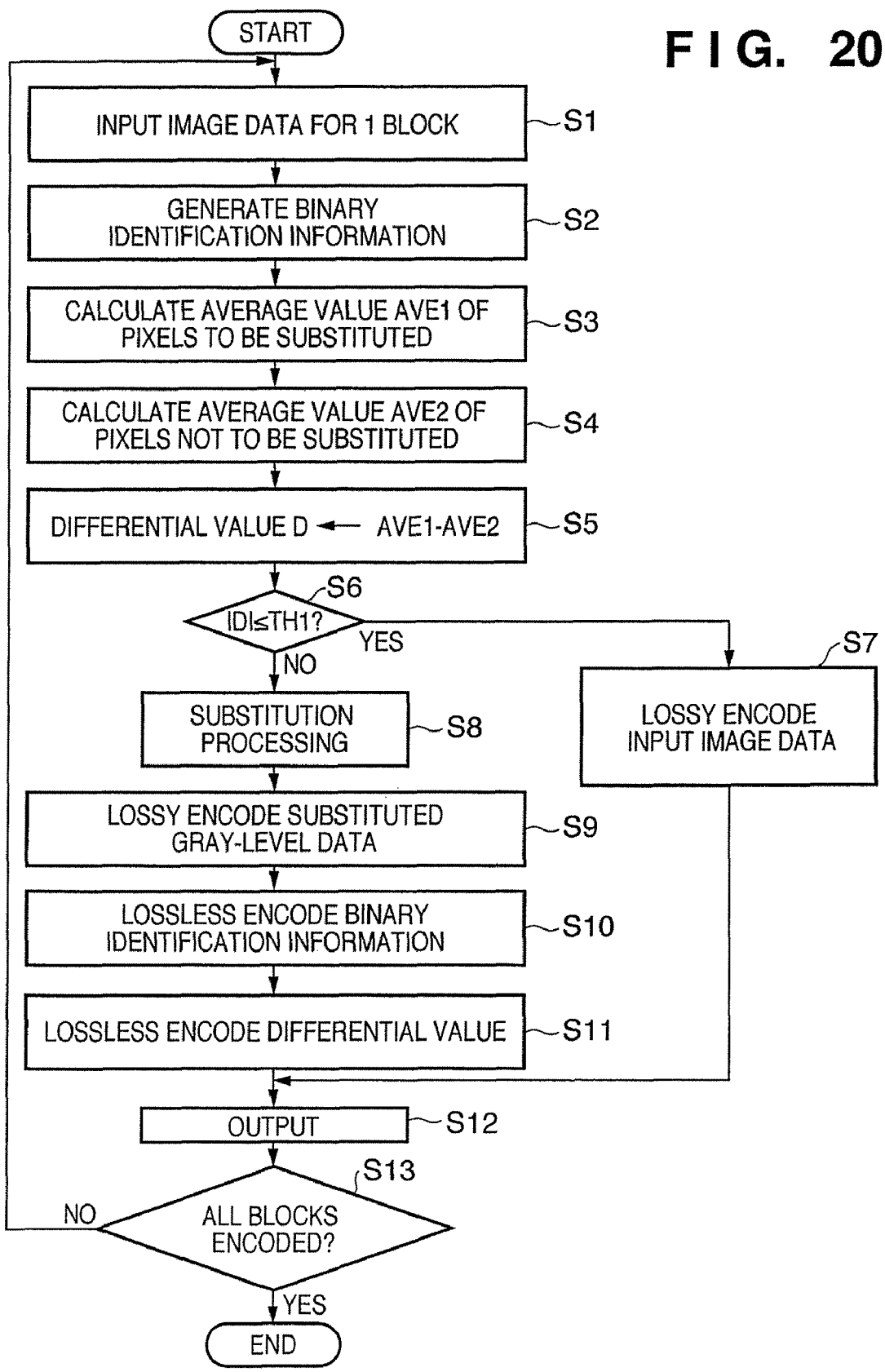
FIG. 20 is a flowchart showing an encoding processing procedure in the information processing apparatus in FIG. 19.

FIG. 20 is a flowchart showing the image encoding processing procedure by the application program according to the present modification. In the following description, image data read with the image scanner 1911 is stored into an input buffer in the RAM 1903. Further, header information of a file written into the external storage device 1904 has been already generated.

First, at step S1, image data for 1 block is read from the input buffer. In the present modification, the size of 1 block is 8×8 pixels. The input image data for 1 block is represented as IM(i, j) (i, j=0, 1, 2, . . . 7).

Next, at step S2, each pixel value within the input 1 block is compared with a preset threshold value TH0 and binarized. The result of binarization, referred to as identification information as in the case of the first embodiment, is represented as B(i, j).

At step S3, the total sum of the pixel values IM(i, j), for which B(i, j)=1 holds, is calculated, and the average value AVE1 is calculated as follows.

$$AVE1 = \{\Sigma B(i,j) \times IM(i,j)\} / \Sigma B(i,j)$$

Note that $\Sigma$ is a combined function of i, j=0, 1, . . . 7. Further, when $\Sigma B(i, j)=0$ holds, AVE1=0 holds.

It is apparent that the processing at step S3 corresponds to the processing in the "1" region average value generation unit 401 in FIG. 3.

At step S4, the total sum of the pixel values IM(i, j), for which B(i, j)=0 holds, is calculated, and the average value AVE2 is calculated as follows.

$$AVE2=\{\Sigma(1-B(i,j))\times IM(i,j)\}/\Sigma(1-B(i,j))$$

When $\Sigma(1-B(i, j))=0$ holds, AVE2=0 holds.

It is apparent that the processing at step S4 corresponds to the processing in the "0" region average value generation unit 402 in FIG. 3.

At step S5, the differential value D is obtained by subtracting the average value AVE2 from the average value AVE1. That is, the processing at step S5 corresponds to the processing in the subtracter 403 in FIG. 3.

At step S6, it is determined whether or not the absolute value of the differential value D is equal to or less than the preset threshold value TH1. When the determination at step S6 is YES, all the pixel values existing in the block of interest have approximately the same value. Accordingly, regarding the block of interest, JPEG encoding (lossy encoding) is performed at step S7. That is, the encoded data of the block of interest corresponds to the block encoded data 1802 in FIG. 18.

On the other hand, when the determination at step S6 is NO, i.e., when it is determined that the absolute value of the differential value D is greater than the threshold value TH1, the process proceeds to step S8, at which the differential value D is subtracted from the pixel value for which B(i, j)=1 holds, thereby the substitution processing is performed. Assuming that the gray-level pixel value after the substitution processing is represented as T(i, j), the following expressions are obtained.

When $B(i,j)=1$ holds, $T(i,j)=IM(i,j)-D$ holds

Note that when $T(i, j)<0$ holds, $T(i, j)=0$ holds

When $B(i,j)=0$ holds, $T(i,j)=IM(i,j)$ holds

At step S9, the gray-level pixel value T(i, j) obtained by the substitution processing is JPEG-encoded (lossy encoded).

Next, at step S10, the binary identification information B(i, j) is lossless encoded, and at step S11, the differential value D is lossless encoded.

Thereafter, the process proceeds to step S12, at which the generated encoded data is outputted as a part of the file. The encoded data of the block of interest through the processing at steps S8 to S11 corresponds to the block encoded data 1801 in FIG. 18.

Thereafter, at step S13, it is determined whether or not all the blocks have been subjected to the encoding processing. If NO, the processing from step S1 is repeated.

As a result of the above processing, the same encoded data as that in the first embodiment can be generated.

Figure 21:
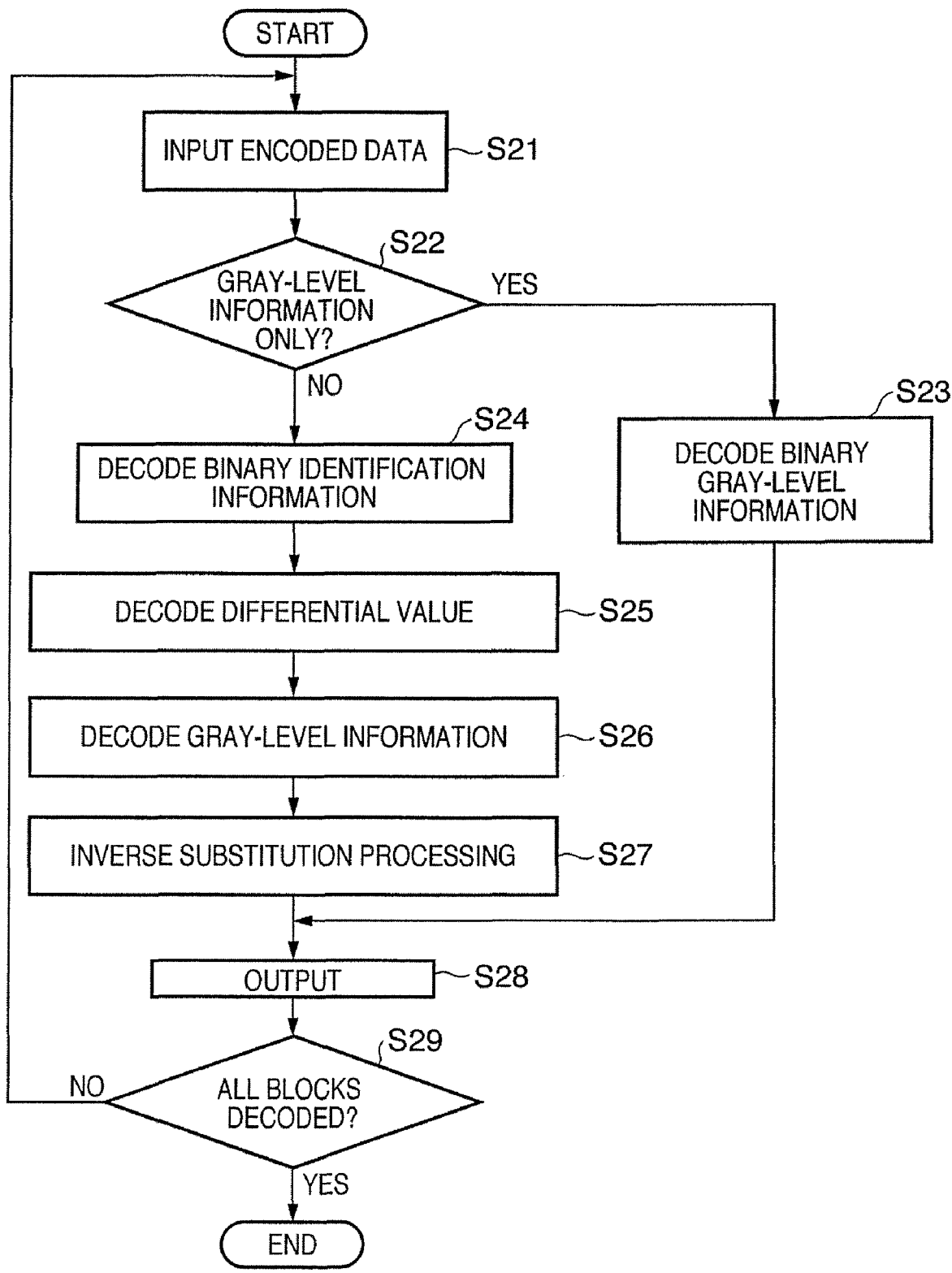
FIG. 21 is a flowchart showing a decoding processing procedure in the information processing apparatus in FIG. 19.

Next, the decoding processing procedure according to the present modification will be described in accordance with the flowchart of FIG. 21. An encoded data file to be decoded is selected by displaying an appropriate GUI screen on the display device 1908 and operating the mouse 1906 by a user.

First, at step S21, encoded data for 1 block is inputted from the selected file. Then at step S22, the block header is analyzed and it is determined whether the data is of the type of the block data 1801 or the type of the block data 1802 in FIG. 18.

When it is determined that the input encoded data is of the type of the block data 1802, i.e., the encoded data includes only encoded data of gray-level information, the process proceeds to step S23, at which JPEG decoding processing is performed.

On the other hand, when it is determined that the input encoded data is of the type of the block data 1801, i.e., the encoded data includes encoded data of identification information, encoded data of differential value and encoded data of gray-level information, the process proceeds to step S24.

At step S24, the binary identification information B(i, j) is decoded, and at step S25, the differential value D is decoded. At step S26, the gray-level information T(i, j) is decoded. Then inverse substitution processing is performed at step S27. Assuming that the image data after the inverse substitution processing is represented as IM'(i, j), the following expressions are obtained.

When $B(i,j)=1$ holds, $IM'(i,j)=T(i,j)+D$ holds

When $B(i,j)=0$ holds, $IM'(i,j)=T(i,j)$ holds

At step S28, the image data for 1 block obtained by decoding at step S23 or S27 is outputted. When the destination of output is the display device 1908, the image data is outputted to the display control unit 1907. When the decoded image data is stored as a file, the image data is outputted to the external storage device 1904.

Thereafter, the process proceeds to step S29, at which it is determined whether or not decoding processing for all the blocks has been completed. If NO, the processing from step S21 is repeated.

As described above, according to the present modification, the same advantage as that of the first embodiment can be obtained with a computer program.

Second Embodiment

In the second embodiment, a function is added so as to further obtain an advantage in addition to that of the first embodiment.

Figure 10:
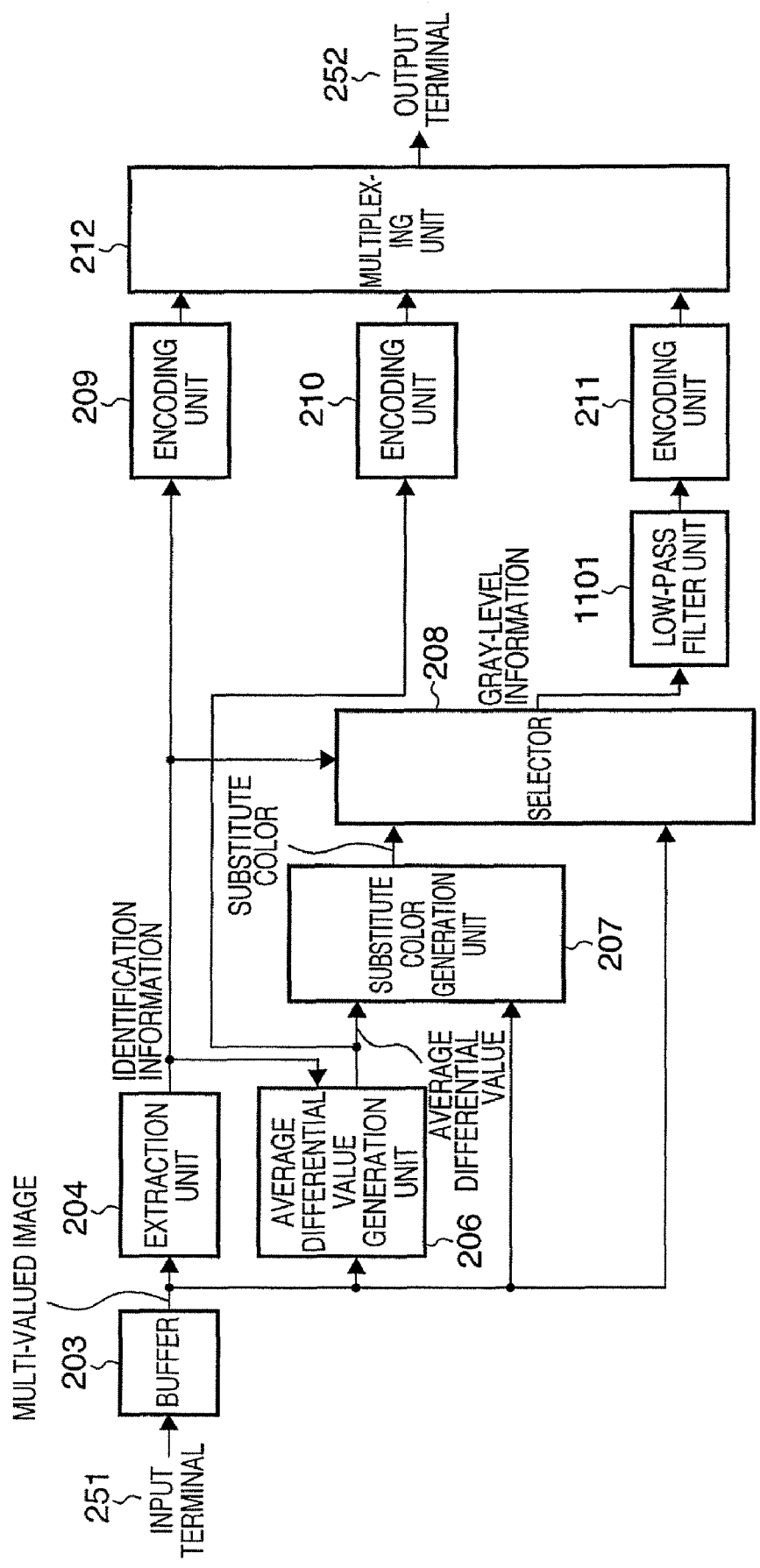
FIG. 10 is a block diagram showing a configuration of the encoding apparatus according to a second embodiment.

FIG. 10 is a block diagram showing a configuration of the encoding apparatus according to the second embodiment.

The configuration in FIG. 10 is the same as that in FIG. 1 except that a low-pass filter unit 1101 is added.

In the first embodiment, the output value from the selector 208 in FIG. 1, i.e., the gray-level information is directly encoded by the encoding unit 211. On the other hand, in the second embodiment, as shown in FIG. 10, the output value from the selector 208, i.e., a high-frequency component of the gray-level information, is suppressed by using the low-pass filter unit 1101. Then the encoding unit 211 encodes the image data (gray-level information) in which the high-frequency component is suppressed after the low-pass filter processing. As a merit of the low-pass filter (LPF) processing, in addition to elimination of noise component, as the boundary between a pixel to be extracted (a pixel for which the identification information is "1") and a pixel not to be extracted is smoothed, further improvement in the compressibility can be expected. Further, as described above, as almost all edges in the block have been already extracted and eliminated by the previous subtraction processing using average differential value (D), the edges of the restored image are not impaired by application of the low-pass filter. Conversely, as an edge impaired upon input remains in the gray-level information after the extraction (substitution) processing, the impaired edge can be eliminated by the low-pass processing and a steep edge can be obtained upon restoration.

Hereinbelow, a particular example of improvement of an edge will be described.

FIGS. 11A to 11F are waveform histograms for explaining the operation of the second embodiment.

Figure 11:
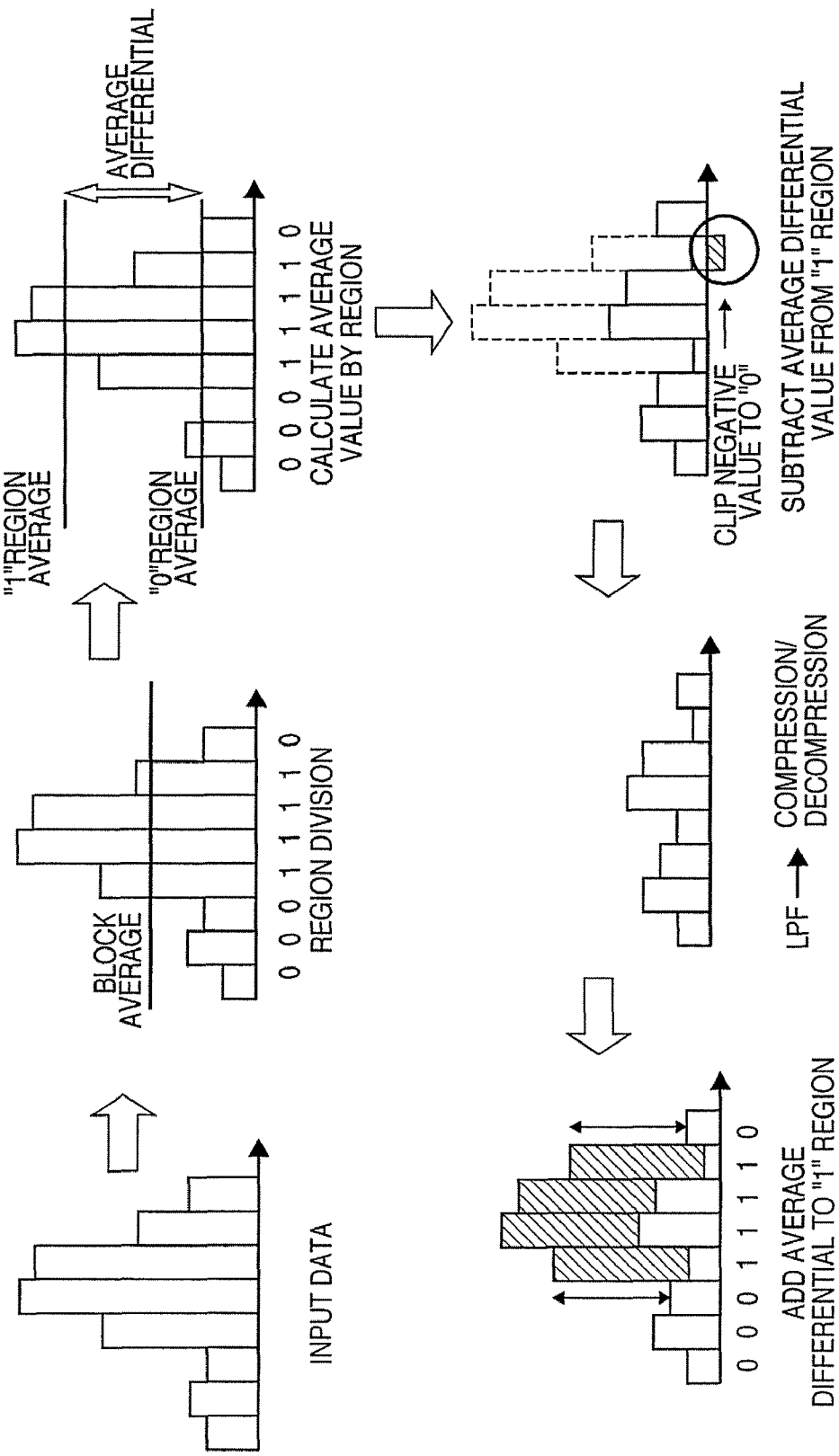
FIGS. 11A to 11F are waveform histograms for explaining the operation of the second embodiment.

FIG. 11A shows an input waveform in an 8×1 one-dimensional block. This waveform (block) is divided into regions using a predetermined threshold value (a block average value here), and position information (the identification information in the first embodiment) is extracted as shown in FIG. 11B. Then an average value is obtained by region using the position information (FIG. 11C), and an average differential value is obtained.

The average differential value is subtracted from the input waveform ("1" region in FIG. 11A (a pixel for which the identification information is "1")), thereby gray-level information in FIG. 11D is obtained. Note that at this time, when the result of subtraction is negative, clipping to "0" is performed as described above. Then an LPF is applied to the gray-level information and through compression and decompression, a waveform shown in FIG. 11E is obtained. In the waveform (FIG. 11E), the average differential value is added to the "1" region (pixels for which the identification information is "1"), thereby the original waveform (block) is restored as shown in FIG. 1F. As indicated with arrows in FIG. 11F, it is apparent that the edge of the "1" region in the boundary portion is steep.

As described above, according to the second embodiment, in addition to the advantage of the first embodiment (and its modification), elimination of noise component can be realized, and upon restoration, a steep edge can be obtained.

Note that it is apparent that processing corresponding to the second embodiment can be realized with a computer program.

Further, in the above respective embodiments, a pixel group for which the identification information is "1" is determined as a pixel group to be extracted, and a pixel group for which the identification information is "0", as a pixel group not to be extracted. Then, an average differential value is subtracted from the values of the respective pixels included in the pixel group to be extracted. However, reversal of the relation between the pixel groups may be realized. That is, it may be arranged such that the pixel group for which the identification information is "0" is determined as a pixel group to be extracted, and the average differential value is added to the values of the respective pixels included in the pixel group. In this case, when the result of addition of the average differential value is over the allowable range of input pixel, the value is clipped to an upper limit value (boundary value). That is, the average differential value may be added or subtracted so as to reduce the respective average values of the pixel group to be extracted and the pixel group not to be extracted.

Third Embodiment

In the first embodiment, upon generation of substitute color, an average differential value is subtracted from respective multi-valued image data within a block, and when the result of subtraction is negative, the substitute color is clipped to "0" (lower limit value) and outputted. This arrangement is most simple and effective when the encoding unit 211, which is e.g. a JPEG encoder, inputs a positive value. This arrangement is based on the fact that even when pixels clipped as the substitute color exist, if the number of the pixels is small and the clip width is small, the image quality after restoration is not much influenced. (See FIGS. 11A to 11D).

Figure 22:
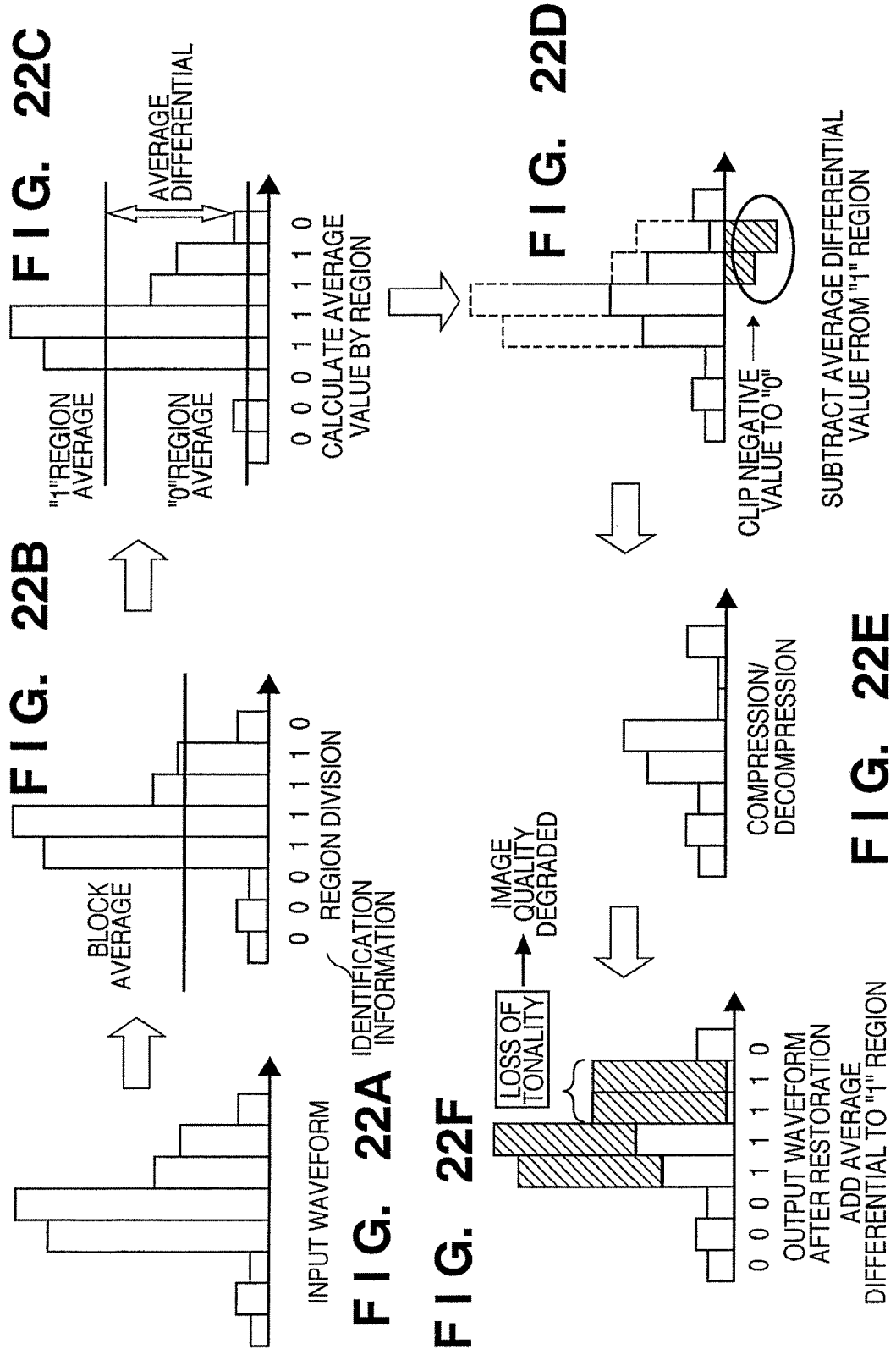
FIGS. 22A to 22F are waveform histograms for explaining a problem caused by substitution processing.

However, in a rare case, the clipping may cause degradation of image quality after restoration in accordance with input image or threshold value used for generation of identification information in the extraction unit 204. Hereinbelow, a particular example will be described using FIGS. 22A to 22F. FIG. 22A shows an input waveform in an 8×1 one-dimensional block. This waveform (block) is divided into regions using a predetermined threshold value, thereby identification information is generated (FIG. 22B). Then an average value is obtained by region using the identification information (FIG. 22C), and an obtained average differential value is subtracted from the "1" region pixel data. The result of subtraction may become a negative value in accordance with threshold value or input waveform. In normal conditions, as described in the first embodiment, even when a pixel value is clipped to "0", the image quality is not much influenced. However, as shown in FIG. 22D, there is a probability that the number of negative value pixels may be large, or negative value pixels may continue. In such case, after the compression/decompression (FIG. 22E), when the average differential value is added to the "1" region, a portion having tonality in the initial input waveform (FIG. 22A) is lost as shown in the output waveform after restoration (FIG. 22F).

In the third embodiment, a function to solve this problem is added.

Figure 23:
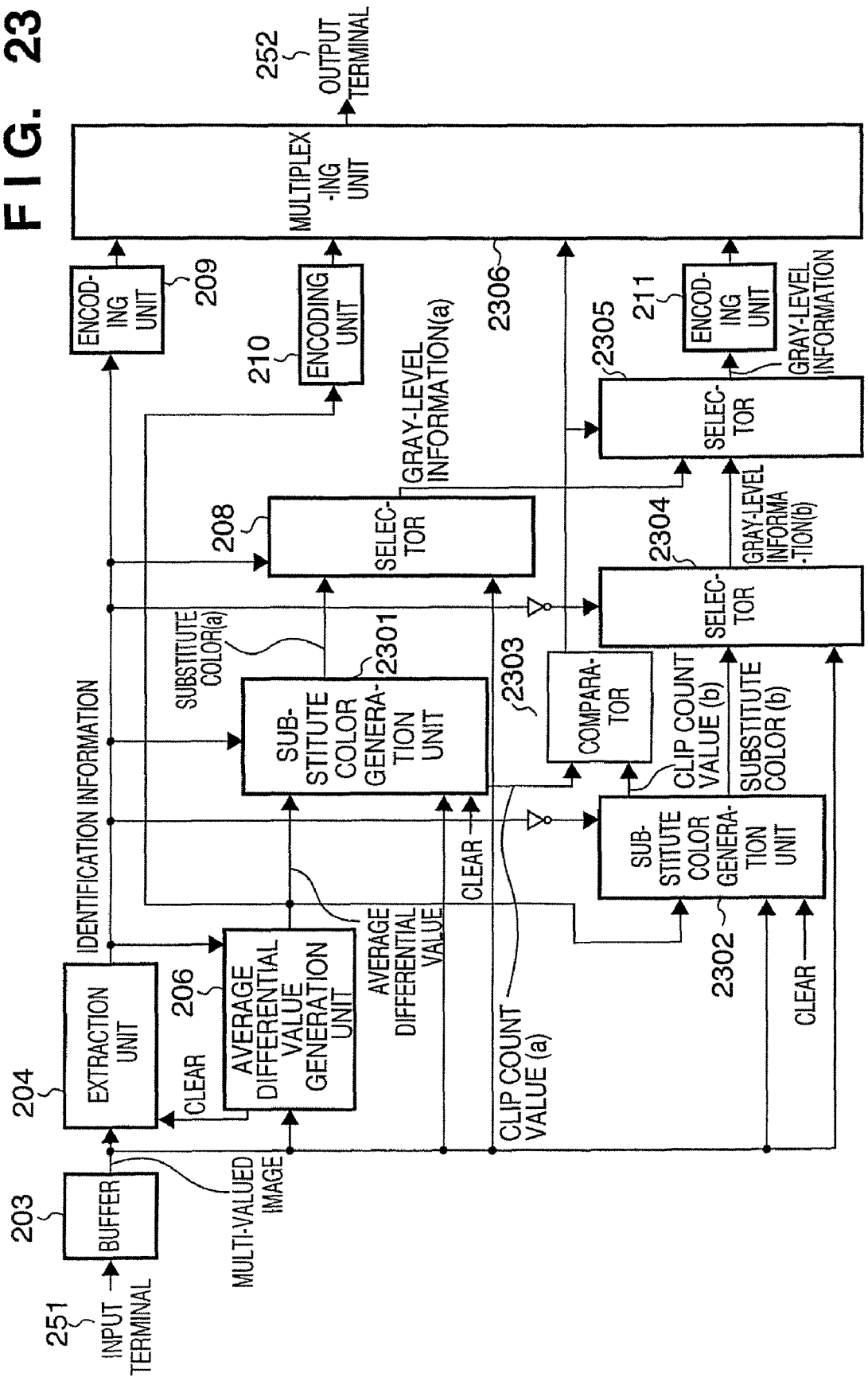
FIG. 23 is a block diagram showing a configuration of the encoding apparatus according to a third embodiment.

FIG. 23 is a block diagram showing a configuration of the encoding apparatus according to the third embodiment.

In FIG. 23, the substitute color generation unit 207 in the configuration in FIG. 1 as the first embodiment is replaced with a substitute color generation unit 2301, and further, a substitute color generation unit 2302, a comparator 2303 and a selector 2304 are added to the configuration in FIG. 1. Other constituent elements are the same as those in the first embodiment.

In the substitute color generation unit 2301, a clip counter which functions as a first count unit to be described later is added to the substitute color generation unit 207 in FIG. 1 of the first embodiment. The clip counter is incremented when the identification information is "1" and the result of subtraction of the average differential value (D) from the respective multi-valued image pixel data within a block outputted from the buffer 203 is negative. The substitute color generation unit 2301 outputs a substitute color (a) by the same method as that used in the substitute color generation unit 207, and outputs the value of the clip counter as a clip count value (a). When the substitute color (a) and the clip count value (a) of the block of interest have been outputted, the clip counter is cleared to "0".

The clip count value (a) represents the number of pixels clipped to "0" (lower limit value) among pixels of the substitute color corresponding to the "1" identification information within the block.

When the input identification information (determination information) is "0", the selector 208 selects pixel data of input multi-valued image corresponding to the identification information and outputs the selected pixel data. On the other hand, when the identification information is "1", the selector 208 selects pixel data of the substitute color (a) outputted from the substitute color generation unit 2302 corresponding to the position of the identification information and outputs the selected pixel data. This processing is repeated by the block end pixel, thereby gray-level information (a) of the block of interest is obtained.

Next, particular operations of the substitute color generation unit 2301 and the selector 208 will be described in a case where multi-valued pixel data of a 4×4 pixel block shown in FIG. 24 is inputted.

In this case, as a block average value is "76", the identification information is as shown in FIG. 25. Further, the average differential value (D) is "200" based on FIGS. 24 and 25.

In the substitute color generation unit 2301, the average differential value "200" is subtracted from all the pixel data within the block. As in the case of the substitute color generation unit 207 described in the first embodiment, when the subtracted value is a negative value, the substitute color generation unit 2301 clips the substitute color value to "0" and outputs the value. When the identification information at that time is "1" indicating a pixel to be extracted, the clip counter is incremented. In this example, since there are two pixels to be extracted, the value of the clip counter is "2". As a result, the substitute color generation unit 2301 outputs 4×4 pixel data as a substitute color (a) shown in FIG. 26, and outputs the value of the clip counter, "2", as a clip count value (a).

The selector 208 selects pixels corresponding to "1" identification information shown in FIG. 25 among the pixels of the substitute color (a) shown in FIG. 26, and pixels corresponding to the "0" identification information among the multi-valued image shown in FIG. 24, and outputs them. As a result, the selector 208 outputs gray-level information (a) shown in FIG. 27. As shown in FIG. 27, a pixel value in a position determined as a character/line image is approximately the same as a pixel value of non-character/non-line image.

The substitute color generation unit 2302 adds the average differential value (D) outputted from the average differential value generation unit 206 to pixel data of the respective multi-valued image within the block outputted from the buffer 203. Then the result of addition is outputted as a substitute color (b). Note that when the result of addition exceeds an allowable range of pixel data, the value is clipped to an upper limit value (boundary value).

Further, as in the case of the above substitute color generation unit 2301, the substitute color generation unit 2302 has a clip counter which functions as a second count unit. Note that the clip counter of the substitute color generation unit 2302 is different from the clip counter of the substitute color generation unit 2301. That is, the clip counter of the substitute color generation unit 2302 is incremented when the identification information is "0" and the result of addition of the average differential value (D) to the respective multi-valued image pixel data within the block outputted from the buffer 203 exceeds the upper limit value (boundary value) of the allowable range of pixel data. Then, when the substitute color (b) and the clip count value (b) have been outputted, the clip counter is cleared to "0".

The clip count value (b) indicates the number of pixels in the substitute color within the block, corresponding to the "0" identification information, clipped to the upper limit value (boundary value).

The selector 2304 has the same function as that of the selector 208. Note that as the identification information (determination information) is inverted and inputted into the selector 2304, when the identification information (determination information) is "1", the selector 2304 selects pixel data of the input multi-valued image corresponding to the position of the identification information and outputs the selected pixel data. On the other hand, when the identification information is "0", the selector 2304 selects pixel data of the substitute color (b) outputted from the substitute color generation unit 2302 corresponding to the position of the identification information and outputs the selected pixel data. This processing is repeated by the block end pixel, thereby gray-level information (b) of the block of interest is obtained.

As described above, the selector 208 functions as a first substitution unit, and the selector 2304, as a second substitution unit.

Next, particular operations of the substitute color generation unit 2302 and the selector 2305 will be described in the case where multi-valued pixel data of 4×4 pixel block shown in FIG. 24 is inputted.

In this case, as a block average value is "76", the identification information is as shown in FIG. 25. Further, the average differential value (D) is "200" based on FIGS. 24 and 25. Note that as inverted identification information is inputted into the substitute color generation unit 2302, a pixel corresponding to the "1" identification information becomes a pixel not to be extracted, and a pixel corresponding to the "0" identification information becomes a pixel to be extracted.

The substitute color generation unit 2302 adds the average differential value "200" to all the pixel data within the block. When the added value is an upper limit value ("255" here), the substitute color 2302 clips he value of the substitute color to "255" and outputs the value. When the identification information at that time is "0" indicating a pixel to be extracted, the clip counter is incremented. In this example, there is no pixel to be extracted, and the value of the clip counter is "0". As a result, the substitute color generation unit 2302 outputs 4×4 pixel data shown in FIG. 28 as a substitute color (b), and outputs the value of the clip counter, "0", as a clip count value (b).

The selector 2304 selects pixels corresponding to the "0" identification information shown in FIG. 25 among the pixels of the substitute color (b) shown in FIG. 28 and pixels corresponding to the "1" identification information among the multivalued image pixels shown in FIG. 24, and outputs them. As a result, the gray-level information (b) outputted from the selector 2302 is as shown in FIG. 29. As shown in FIG. 29, the pixel value in the position judged as a non-character/line image is approximately the same value as that of a pixel value of character/line image.

The comparator 2303 compares the clip count value (a) outputted from the substitute color generation unit 2301 with the clip count value (b) outputted from the substitute color generation unit 2302 upon completion of processing for 1 block. Then, when the clip count value (a) is equal to or less than the clip count value (b), the comparator 2302 outputs "0", otherwise, outputs "1", as a determination signal SEL.

Then, when the SEL signal is "0", the selector 2305 having a block buffer (not shown) selects the gray-level information (a) inputted from the selector 208 and outputs the selected information, on the other hand, when the SEL signal is "1", the selector 2305 selects the gray-level information (b) inputted from the selector 2304, and outputs the selected information, in synchronization with the determination signal from the comparator 2303. That is, the selector 2305 selects gray-level information in which the number of clipped pixels is smaller.

The gray-level information outputted from the selector 2305 is compressed by the same compression method as that in the first embodiment (lossy encoded) by the encoding unit 211. Further, the identification information outputted from the extraction unit 204 and the average differential value outputted from the average differential value generation unit 206 are compressed by the same compression method as that in the first embodiment (lossless encoded) by the encoding unit 209 and the encoding unit 210.

A multiplexing unit 2306 combines the encoded data compressed by the encoding unit 209, the encoding unit 210 and the encoding unit 211, and the SEL signal (selection information) to notify the decoding unit of the type of the gray-level information (gray-level information (a) or gray-level information (b)) encoded by the encoding unit 211, for storage in a memory in the subsequent stage, and output the combined data from the output terminal 252.

Note that it may be arranged such that a sign bit in place of the SEL signal is added to the average differential value, and when the SEL signal is "1", the average differential value is stored as a negative value into the memory. In this case, upon decoding, image restoration can be realized, not by selecting a decoding method based on the SEL signal, but by adding the average differential value to pixels corresponding to the "1" identification information. Note that in the above example, the following relation is not always held (when the average differential value is negative, the relation is reversed).

{Pixel value corresponding to "1" identification information}>{pixel value corresponding to "0" identification information}

As described above, according to the third embodiment, as clipping by substitution operation almost does not occur, an image without poor tonality can be restored.

Note that it is apparent that processing corresponding to the third embodiment can be realized with a computer program.

Further, it goes without saying that when the low-pass filter shown in the second embodiment is applied to the third embodiment, the same advantage can be obtained.

Fourth Embodiment

In the third embodiment, the identification (selection) of the differential value is needed. In the fourth embodiment, by scheming the setting of the differential value so as not to change the minimum value in the area corresponding to identification information "1" to negative, the problem of the substituted pixel value being negative can be solved without using the identification (selection) signal.

Figure 30:
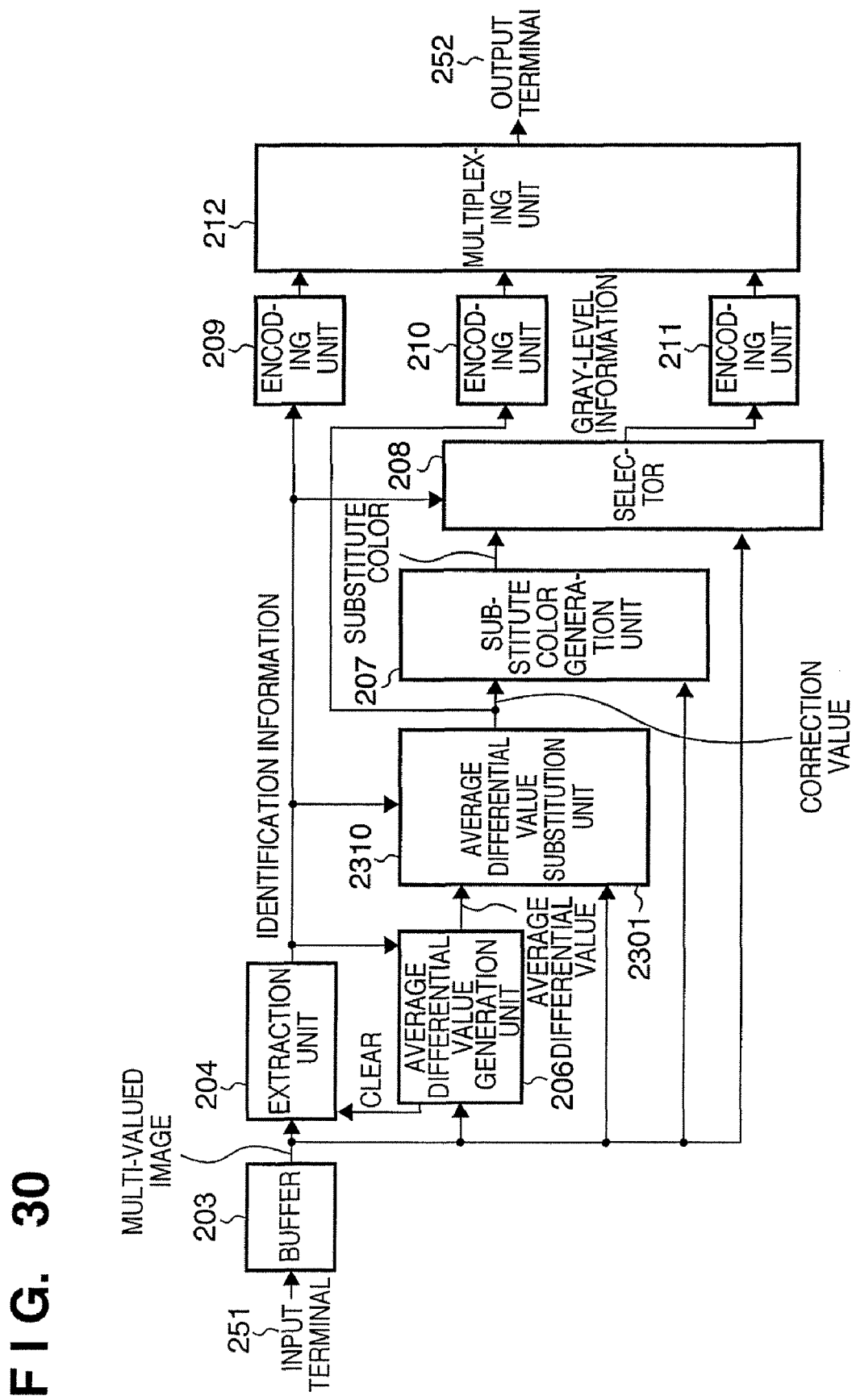
FIG. 30 is a block diagram showing a configuration of the encoding apparatus according to a fourth embodiment.

FIG. 30 is a block diagram showing a configuration of the encoding apparatus according to the fourth embodiment.

In FIG. 30, the difference from the configuration in FIG. 1 as the first embodiment is that an average differential value substitution unit 2310 is added to the configuration in FIG. 1. Other constituent elements are the same as those in the first embodiment. Hereinbelow, only the difference from the first embodiment will be described.

The average differential value substitution unit 2310 compares a minimum value of pixels corresponding to the "1" identification information outputted from the extraction unit 204 within a block outputted from the buffer 203, with a differential value outputted from the average differential value generation unit 206, and selects a less value and outputs the selected value. Hereinbelow, the value selected and outputted by the average differential value substitution unit 2310 will be referred to as a correction value.

Next, the details of the average differential value substitution unit 2310 will be described.

Figure 31:
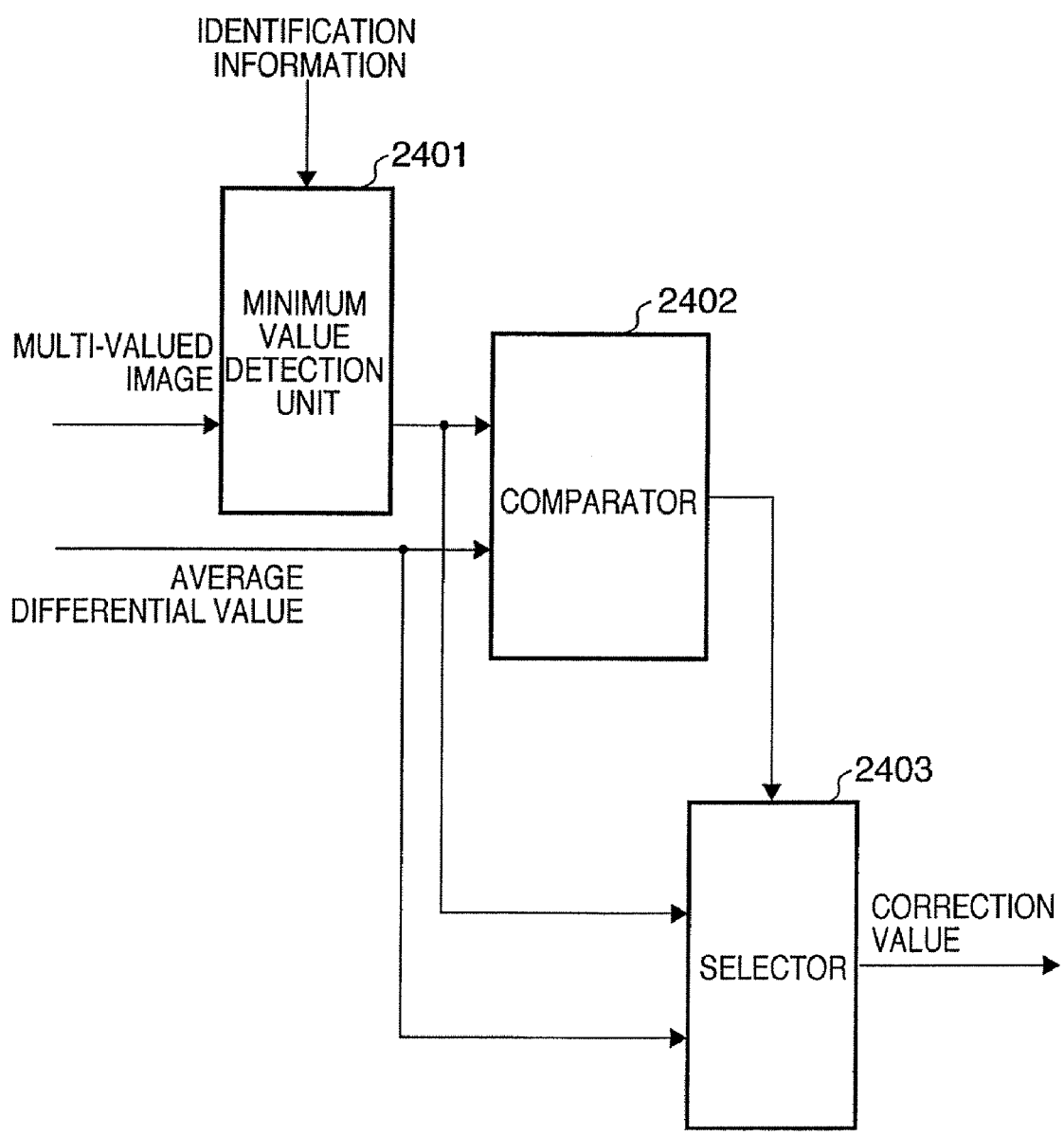
FIG. 31 is a block diagram showing an example of an average differential value substitution unit in FIG. 30.

FIG. 31 is a block diagram of the average differential value substitution unit 2310.

A minimum value detection unit 2401 inputs the respective pixel data of multi-valued image within the block outputted from the buffer 203, and outputs a minimum value of the pixel data corresponding to the "1" identification information outputted from the extraction unit 204. Then a comparator 2402 compares the minimum value with the differential value outputted from the average differential value generation unit 206. When the differential value is less than the minimum value, the comparator 2402 outputs "0", otherwise, outputs "1", as a selection signal. Then a selector 2403 selects a less one of the minimum pixel value of the multi-valued image and the differential value based on the selection signal, and outputs the selected value as a correction value.

Next, the operation of the average differential value substitution unit 2301 will be described. When pixel data of a 4×4 pixel block as shown in FIG. 24 is inputted, the differential value (D) is "200", and the identification information is as shown in FIG. 25.

At this time, the minimum value of pixel data corresponding to the "1" identification information is "104", and the minimum value, in comparison with the differential value (D), is less than the differential value (D). Accordingly, the average differential value substitution unit 2310 outputs the minimum value "104" as a correction value.

The subsequent processing is the same as that in the first embodiment. Note that the substitute color generation unit 207 subtracts the substitute value outputted from the average differential value generation unit 206 from the respective pixel data of multi-valued image within the block outputted from the buffer 203. At this time, when the result of subtraction is a negative, the selector 208 does not select the value.

FIGS. 32A to 32G are waveform histograms showing an advantage of the fourth embodiment.

FIG. 32A shows an input waveform in an 8×1 one-dimensional block. This waveform (block) is divided into regions using a predetermined threshold value (e.g. a block average value) thereby identification information is generated (FIG. 32B). Then an average value is obtained by region using the identification information (FIG. 32C). Then an obtained temporary average differential value is compared with pixel data minimum value in the "1" region, and a less value is subtracted as an average differential value (FIG. 32D) from the input waveform. As shown in FIG. 32E, the result of subtraction has no negative value pixel. Accordingly, after the compression/decompression processing (FIG. 32F), when the average differential value is added to the "1" region, the tonality is maintained as shown in an output waveform after restoration (FIG. 32G).

In the above description, the correction value is subtracted from the pixel values of the "1" identification information, however, the correction value may be added to the pixel values of the "0" identification information. In this case, the average differential value substitution unit 2310 obtains a maximum pixel value of pixels corresponding to the "0" identification information outputted from the extraction unit 204 within the block outputted from the buffer 203. Then the average differential value substitution unit 2310 compares a differential value between the maximum pixel value and an upper limit value ("255" in this embodiment) of pixel value, with the average differential value outputted from the average differential value generation unit 206, and outputs a less value as a correction value. The substitute color generation unit 207 adds the substitute value outputted from the average differential value generation unit 206 to the respective pixel data of multi-valued image within the block outputted from the buffer 203. At this time, when the result of addition exceed the upper limit vale, the selector 208 does not select the value.

As described above, according to the fourth embodiment, as no clipping by substitution operation occurs, an image without poor tonality can be restored.

Note that it is apparent that processing corresponding to the fourth embodiment can be realized with a computer program.

Further, it goes without saying that when the low-pass filter shown in the second embodiment is applied to the fourth embodiment, the same advantage can be obtained.

Further, in the above embodiments, for the sake of simplification of explanation, the block size is 4×4 (or 8×1) pixels. However, generally, the block size is preferably determined in accordance with encoding to compress gray-level information (e.g., orthogonal transformation size). For example, when JPEG encoding is employed, the block size is preferably an integral multiple of DTC block size (8×8). For example, the size of 1 block is 8×16 pixels, two 8×8 pixels exist in this block. Accordingly, the encoding unit 211 performs DCT transformation, quantization and entropy encoding processing on two 8×8 pixel blocks.

Further, as in the case of the modification to the first embodiment, the present invention can be realized with a computer program. Generally, a computer program is stored in a computer-readable storage medium such as a CD-ROM. Then the medium is set in a reading device (CD-ROM drive or the like) of a computer, and the program is duplicated or installed into the system, thereby the program becomes executable. Accordingly, it is apparent that the computer-readable storage medium is included in the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-216260, filed Aug. 8, 2006, 2007-148627, filed Jun. 4, 2007, 2007-180157, filed Jul. 9, 2007 which are hereby incorporated by reference herein in their entirety.

What is claimed is:

1. An image encoding apparatus comprising:
a processor programmed to control:
an input unit adapted to input multi-valued image data by block constituted by plural pixels;
an identification information generation unit adapted to classify respective pixels within an input block into first and second groups in correspondence with respective pixel values, and generate identification information to identify groups of the respective pixels;
a calculating unit adapted to calculate an average value of pixels belonging to said first group, an average value of pixels belonging to said second group, and a differential value between said two average values;
a substituting unit adapted to add said differential value to respective pixels belonging to said first group or subtract said differential value from the respective pixels belonging to said first group, so as to reduce a difference between the average value of said first group and the average value of said second group, thereby substitute pixel values belonging to said first group; and
an encoding unit adapted to encode respective pixel values in the block after substitution, said differential value and said identification information, and output encoded data of block of interest.

2. The image encoding apparatus according to claim 1, wherein when a value of a pixel of interest after the substitution is over an allowable range of the pixel, said substituting unit sets the value of said pixel of interest to a boundary value of said range.

3. The image encoding apparatus according to claim 1, further comprising a low-pass filter processing unit adapted to perform low-pass filter processing on the respective pixel values in the block substituted by said substituting unit,
wherein said encoding unit encodes the pixel values in the block after said low-pass filter processing.

4. The image encoding apparatus according to claim 1, wherein said encoding unit performs lossless encoding on said differential value and said identification information.

5. The image encoding apparatus according to claim 4, wherein said encoding unit performs lossy encoding on the respective pixel values in the block after the substitution by the substituting unit.

6. The image encoding apparatus according to claim 5, wherein the size of the block in said input unit is an integral multiple of a block size upon lossy encoding by said encoding unit.

7. The image encoding apparatus according to claim 1, further comprising:
a determination unit adapted to determine whether or not an absolute value of the differential value calculated by said calculating unit is equal to or less than a pre-set threshold value; and
a second encoding unit adapted to, when said determination unit determines that the absolute value of said differential value is equal to or less than said threshold value, encode and output the pixel values in the input block without any processing, in place of said encoding unit.

8. A computer program, stored on a non-transitory computer readable medium, to cause a computer to perform functions of the image encoding apparatus in claim 1.

9. A non-transitory computer-readable storage medium holding the computer program in claim 8.

10. A control method for an image encoding apparatus comprising:
an input step of inputting multi-valued image data by block constituted by plural pixels;
an identification information generation step of classifying respective pixels within an input block into first and second groups in correspondence with respective pixel values, and generating identification information to identify groups of the respective pixels;
a calculation step of calculating an average value of pixels belonging to said first group, an average value of pixels belonging to said second group, and a differential value between said two average values;
a substitution step of adding said differential value to respective pixels belonging to said first group or subtract said differential value from the respective pixels belonging to said first group, so as to reduce a difference between the average value of said first group and the average value of said second group, thereby substituting pixel values belonging to said first group; and
an encoding step of encoding respective pixel values in the block after substitution, said differential value and said identification information, and outputting encoded data of block of interest.

11. An image decoding apparatus for decoding image data encoded by block, comprising:
a processor programmed to control:
a decoding unit adapted to input encoded data of a block, and decode gray-level information of respective pixels included in said block, differential information, and, by pixel position in said block, identification information indicating that said pixel is to be substituted or not; and
a restoration unit adapted to, regarding pixels not to be substituted based on the identification information obtained by decoding, output the decoded gray-level information as a result of restoration, and regarding pixels to be substituted, output a result of addition of said differential value to the decoded gray-level information or subtraction of said differential value from the decoded gray-level information, as a result of restoration.

12. A computer program, stored on a non-transitory computer readable medium, for causing a computer to perform functions of the image decoding apparatus in claim 11.

13. A non-transitory computer-readable storage medium holding the computer program in claim 12.

14. A control method for an image decoding apparatus for decoding image data encoded by block, comprising:
- a decoding step of inputting encoded data of a block, and decoding gray-level information of respective pixels included in said block, differential information, and, by pixel position in said block, identification information indicating that said pixel is to be substituted or not; and
- a restoration step of, regarding pixels not to be substituted based on the identification information obtained by decoding, outputting the decoded gray-level information as a result of restoration, and regarding pixels to be substituted, outputting a result of addition of said differential value to the decoded gray-level information or subtraction of said differential value from the decoded gray-level information, as a result of restoration.

* * * * *